United States Patent Office 3,817,698
Patented June 18, 1974

3,817,698
KERATINIC FIBER DYE COMPOSITIONS CONTAINING N,N'-DI-NITROPHENYL OR NITROPHENYL - ANTHRAQUINONE SUBSTITUTED ALKYLENE DIAMINE DYES AND THE MONO-QUATERNARY AMMONIUM SALTS THEREOF
Gregoire Kalopissis, Paris, and Andree Bugaut, Boulogne-sur-Seine, France, and Hubert Gaston-Breton, Tokyo, Japan, assignors to Societe Anonyme dite: L'Oreal, Paris, France
No Drawing. Continuation-in-part of abandoned application Ser. No. 655,337, July 24, 1967. This application Jan. 26, 1971, Ser. No. 109,930
Int. Cl. A61k 7/12
U.S. Cl. 8—10.1                 11 Claims

ABSTRACT OF THE DISCLOSURE

A dye composition for dyeing keratinic fibers comprises an aqueous solution of a dye having one of the following formulas:

(1) 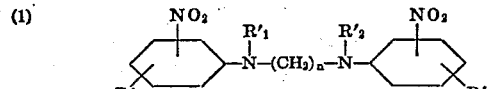

(2) 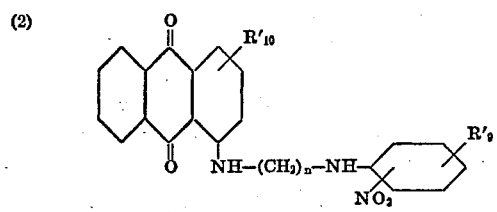

and (3) 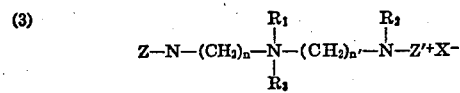

wherein $R'_1$ and $R'_2$ are hydrogen, lower alkyl, hydroxy lower alkyl and lower alkyl amino lower alkyl; $R'_3$ is hydrogen, lower alkoxy and

wherein $R'_4$ and $R'_5$ are hydrogen, lower alkyl, hydroxy lower alkyl, lower alkylamino lower alkyl and amino lower alkyl; $R'_6$ is hydrogen, lower alkoxy and

wherein $R'_7$ and $R'_8$ are hydrogen, lower alkyl, hydroxy lower alkyl and amino lower alkyl; $R'_{10}$ is

wherein $r''$ and $r'''$ are hydrogen and lower alkyl; $R'_0$ is

wherein $R_{11}$ and $R_{12}$ are lower alkyl and amino lower alkyl; Z and Z' are dimethylamino nitro phenyl and nitro phenyl; R, $R_1$, $R_2$ and $R_3$ are hydrogen and lower alkyl, $n$ in formulas (1) and (2) is 2–4 and $n$ and $n'$ in formula (3) is 2–6; and X is halogen. The dye is present in amounts of 0.1–3 percent by weight of the composition and after being applied to the hair is left thereon for a period of about 5–30 minutes at a temperature between 15–35° C., followed by rinsing, washing and drying the hair.

This application is a continuation-in-part of application Ser. No. 655,337, filed July 24, 1967, now abandoned.

The object of the present invention is to provide a dye conventionally designated as AB, essentially characterized by the fact that it is formed by the covalent bonding of two compounds A and B, which are themselves dyes or dye bases. The molecular structure of each of the compounds A and B is maintained in the structure of this new AB type dye. Because of this, the new dye has the coloring properties of both of its constituent compounds A and B.

These dyes have one of the following four formulas:

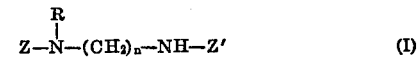 (I)

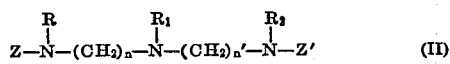 (II)

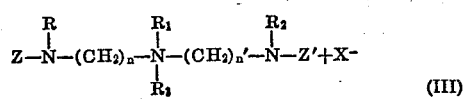 (III)

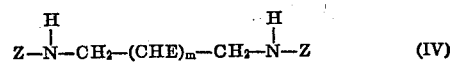 (IV)

In these formulas:

Z and Z' represent the remainder of the two compounds A and B and are selected from nitro dyes of the benzene series or anthraquinone dyes,
R, $R_1$, $R_2$, $R_3$ may be the same or different and represent a hydrogen atom or a lower alkyl radical or a hydroxyalkyl radical comprising at most 4 carbon atoms,
E represents a hydrogen atom or an OH radical,
$n$, $n'$ are two whole numbers between 2 and 6 inclusive and may be the same or different,
$m$ is a whole number between 0 and 4 inclusive, and
X represents a halogen atom.

Another object of the present invention is to provide the addition salts formed with the acids or quaternary ammonium salts which may be prepared from dye AB as well as its mono- or polyhydroxylalkyl derivatives and its mono- or polyaminoalkyl derivatives.

Another object of the present invention is to provide processes for preparing a new dye AB, the process being characterized by the fact that a chemical compound which is a dye or a dye base having the following formula:

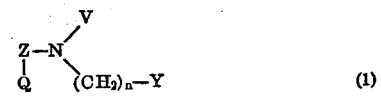 (1)

in which:

Y represents a halogen atom, an alkali or alkaline-earth metal atom, or a primary, secondary or tertiary amine group,
Z has the meaning indicated above,
Q represents a hydrogen atom or a halogen atom such as chlorine or bromine, which may be easily substituted by a —NHR$_5$ radical, R$_5$ representing a lower alkyl, lower hydroxyalkyl or alkoxyalkyl radical or a chain:

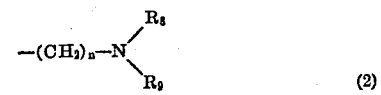 (2)

$R_8$ and $R_9$ being the same or different and representing a hydrogen atom, a lower alkyl, lower hydroxyalkyl or acetyl radical, or being part of a heterocycle, V represents the symbol R or the $SO_2$—$Z''$ radical, $Z''$ represents a phenyl or tolyl radical ($Z$, $n$ and R having the significances hereinbefore assigned thereto), is condensed on a second chemical compound which is itself a dye or dye base, having the formula:

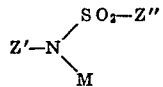  (3)

if Y is a halogen atom;

having the formula:

  (4)

if Y is a primary amine group;

having the formula:

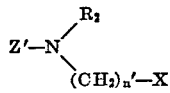  (5)

if Y is a secondary or tertiary amine group;

when in the last case the condensation is accompanied by quaternization, having the formula:

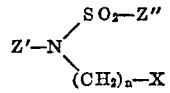  (6)

or having the formula:

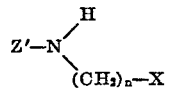  (7)

if Y is an alkali or alkaline-earth metal atom and $n=0$ formulas (1), (2), (3), (4), (5), (6) and (7), in which:

M represents an alkali or alkaline-earth metal atom, $Q_1$ represents a mobile group such as a —$NO_2$ group or a halogen atom which may be easily substituted by an amine function, Z, Z', Z'', V, X, $R_1$, $R_2$, $n$ and $n'$ having the significances hereinbefore assigned thereto, and that the $SO_2$—$Z''$ group is hydrolyzed.

The compounds answering to formula (1) are prepared:

(a) From a compound A, having the general formula:

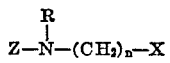  (8)

in which Z, R, X and $n$ have the significances hereinbefore assigned thereto, and then by hydrolyzing the sulfonamide function of the resultant product;

(b) From a compound A having the formula:

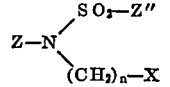  (9)

or the formula:

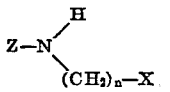  (10)

which is condensed on a compound B having the formula:

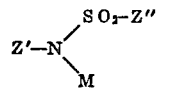  (3)

in which formulas Z, Z', Z'', M, X and $n$ have the significances hereinbefore assigned thereto, and by then hydrolyzing the sulfonamide function or functions of the resultant product;

(c) From a compound A, having the general formula:

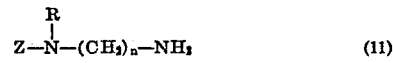  (11)

in which $n$, Z and R have the significances hereinbefore assigned thereto, which is condensed on a compound B, having the general formula:

$$Z'—Q_1 \quad (4)$$

in which:

$Q_1$ represents a mobile group, such as an —$NO_2$ group or a halogen atom which may be easily substituted by an amine function, and Z' has the significance hereinbefore assigned thereto;

Z' has the significance hereinbefore assigned thereto;

(d) From a compound A, having the formula:

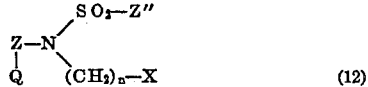  (12)

which is condensed on a compound B, having the general formula:

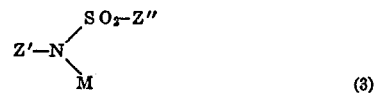  (3)

in which formulas Z, Z', Z'', X, M, Q and $n$ have the significances hereinbefore assigned thereto, and in the condensation product, by first substituting the halogen atom Q by reaction with an amine having the general formula:

$$H_2N—R_5 \quad (13)$$

($R_5$ having the significance hereinbefore assigned thereto), then by hydrolyzing the sulfonamide functions of the resultant product.

(e) From a compound A, having the formula;

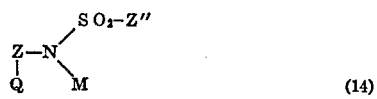  (14)

which is condensed on a compound B, having the formula:

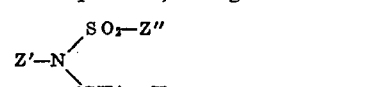  (6)

or the formula:

  (7)

in which formulas Z, Z', Z'', X, M, Q and $n$ have the significances hereinbefore assigned thereto, and in the condensation product, by first substituting the halogen atom Q by reaction with an amine having the general formula:

$$H_2N—R_5 \quad (13)$$

($R_5$ having the significance hereinbefore assigned thereto), then by hydrolyzing the sulfonamide functions of the resultant product.

The compounds having the general formula (II) are prepared:

From a compound A having the general formula:

  (15)

in which $n$, Z, R and $R_1$ have the significances hereinbefore assigned thereto, which is condensed on a compound B, having the formula:

  (5)

in which Z', R$_2$, n', and X have the significances hereinbefore assigned thereto.

The compounds having the general formula (III) are prepared:

From a compound A having the formula:

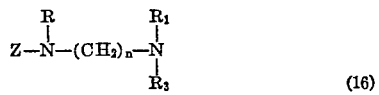

in which Z, R, R$_1$, R$_3$ and n have the significances hereinbefore assigned thereto, which is condensed on a compound B, having the formula:

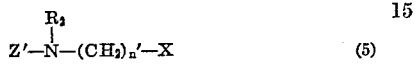

in which Z', R$_2$, n' and X have the significances hereinbefore assigned thereto.

Next (to improve their solubility in water or their affinity for certain fibers) the dyes may be made to undergo certain changes such as:

Quaternization of original or subsequently introduced tertiary amine functions; in particular, a dye according to the invention may be changed to a quaternary dye by the usual process, that is, by condensation with a lower alkyl halide or an aryl halide or with an alkyl sulfate. It should be noted that this quaternization does not change the basic color of the original product at all when carried out on a extranuclear teritary amine. On the other hand, when carried out on an aromatic tertiary amine, it may in certain cases change the basic color;

Change of a dye according to the invention into a mono- or polyhydroxyalkylated compound by condensing a halogenated substitution product of an aliphatic mono- or polyalcohol on one or more of the primary or secondary amine groups;

Change of a dye according to the invention into a mono- or polyaminoalkylated compound by condensing a dye of formula (I) or (II) on one or more of the primary or secondary amine groups.

From a primary or secondary monohalogenoalkylamine having the formula:

$$R_4-NH-(CH_2)_n-X \qquad (17)$$

in which:

X and n have the significances hereinbefore assigned thereto, and

R$_4$ represents a lower alkyl radical or a hydrogen atom; or

From a tertiary amine having the formula:

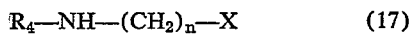

in which:

X and n have the significances hereinbefore assigned thereto, and

R$_7$ and R$_6$ represent a lower alkyl radical, or may be part of a heterocycle, being the same or different.

In the case of the condensation of a tertiary amine of formula (18), the aminoalkylation may be followed, if desired, by a quaternization.

It should be noted that these alkylations may be accompanied by a deepening of the color of the dye undergoing them.

A further object of the present invention is to provide the addition salts formed with the acids or quaternary ammonium salts which may be prepared from compounds of formula (IV), as well as its mono- or polyhyrdoxyalkylated derivatives and its mono- or polyaminoalkylated derivatives.

Yet another object of the present invention is to provide several processes for preparing a dye corresponding to formula IV.

Compounds according to formula IV may be prepared:

(a) From a compound having the general formula:

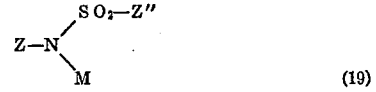

which is condensed on a compound having the formula:

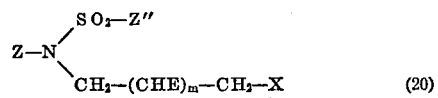

or the formula:

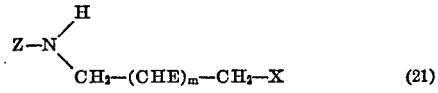

in which

Z and m have the significances hereinbefore assigned thereto,

Z" represents a phenyl or tolyl radical,

M represents an alkali or alkaline-earth metal atom,

X represents a halogen atom, and

E represents a hydrogen atom or the OH radical, by then hydrolyzing the sulfonamide function or functions of the resultant product;

(b) From a compound having the general formula:

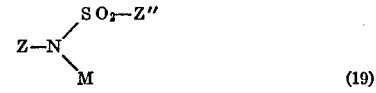

in which Z, Z" and M have the significances hereinbefore assigned thereto, which is condensed on a dihalogenoalkane having the formula:

$$X-CH_2-(CHE)_m-CH_2-X \qquad (22)$$

in which X represents a halogen atom in the presence of dimethylformamide, by then hydrolyzing the sulfonamide functions of the product obtained;

(c) From a dihalogenoalkane having the formula:

$$X-CH_2-(CHE)_m-CH_2-X \qquad (22)$$

which is condensed on a compound having the formula:

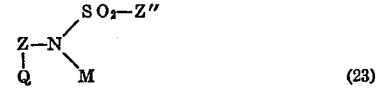

in which:

Z", Z and M have the significances hereinbefore assigned thereto and

Q represents a halogen atom such as chlorine or bromine, by substituting the halogen atom Q after the condensation by the action of an amine having the general formula:

$$H_2N-R_5 \qquad (24)$$

then by hydrolyzing the sulfonamide functions of the resultant product;

R$_5$ representing a lower alkyl or alkoxyalkyl group or a chain:

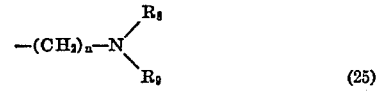

R$_8$ and R$_9$ being the same or different and representing a halogen atom, a lower alkyl, lower hydroxyalkyl or acetyl radical or being part of a heterocycle, n representing a whole number between 2 and 6, inclusive.

In order to improve their solubility in water or their affinity for certain fibers, these dyes may be changed in the same way as previously described in discussing the dyes corresponding to formulas I and II.

The dyes according to the present invention may be advantageously used in a great number of industrial applications. They may be used, for example, in the textile industry and more particularly for dyeing keratinic fibers. A particularly profitable field of application in this last area is their use for dying hair.

It is known that the technique for dyeing different natural and synthetic fibers is based on the use of a greater or smaller number of individual dyes used collectively. The action of such mixtures during the dyeing often poses serious problems, particularly as concerns the harmonization of the different affinities of dyes used simultaneously and harmonization of the speed with which they act on the fibers and of their fastness to washing.

Consequently, users frequently discover significant difficulties as much from the point of view of the formulation of these mixtures as from the point of view of their application. Use of dyes according to the invention partly solves the problem since a single dye has the tinctorial properties of the two dyes from which it was formed.

Moreover, dyes according to the invention have a considerable advantage over the so-called "dispersed" dyes which have until now been used for dyeing hair.

Indeed, in the technique presently used to dye hair, methods of using derivatives of nitroparaphenylene diamine dyes normally used to dye wool and more precisely so-called "dispersed" dyes, as color adjusting dyes in conjunction with direct dyes, have long been sought. But the results have always been poor, both because these dyes have a low affinity for keratin (under conditions for dyeing hair) and because they are not resistant to washing.

Now applicants have found that the dyes according to the invention are superior to dispersed dyes both with respect to their increased resistance to washing and to their affinity.

These same advantages of better resistance to washing and of affinity are found when they are compared to dispersed dyes with respect to use of the dyes in the presence of solvents such as butylglycol and benzyl alcohol. It should be noted that this latter process is currently used in capillary dyeing.

The dyes according to the invention have a series of advantages which go with their molecular weight, which is rather high.

In capillary dyeing the problem often arises of hair which is already somewhat discolored over part of its length. Consequently, there are two types of fibers present, which has always posed a difficult problem, that of selectivity with respect to the affinity of the dye for these two parts.

Now, use of dyes according to the present invention leads to an even color all over the hair. This property is due to the high molecular weight of these compounds and to their lesser penetration of the discolored portion which is known to be very easy to tint with the usual dyes.

In the same way as above, a parallel case may be presented in which the hair has previously been given a permanent. In this case also, when there are two different portions present, one already given a permanent and the other (the root) natural, the first being easier to dye than the second, an uneven color may result.

One advantage of the dyes according to the invention is that they can provide a uniform color for such hair.

It has been noted by applicants that these dyes work very well in the case of dyeing highly discolored hair, as is often encountered in practice, and that they yield very satisfactory results.

Since these days are polyfunctional compounds, they offer a wider range of possibilities for all sorts of reticulation and condensation reactions, and may consequently constitute worthwhile intermediates for use in synthesis.

A further object of the present invention is to provide a new tinctorial composition for keratinic fibers and particularly for hair, essentially characterized by the fact that it contains at least one above-indicated soluble dye AB in aqueous solution.

Yet another object of the present invention is to provide a process for dying hair essentially characterized by the fact that over a period of about 5 to 30 minutes a coloring solution according to the invention, such as that defined above, is applied to the hair at a temperature of between 15° and 35° C. and that the hair is then rinsed and dried.

Of course the coloring compositions according to the invention may also contain different ingredients presently used in dyeing keratinic fibers, such as, for example, organic solvents, thickeners, detergents and lacquers. The concentration of dyes according to the invention may vary over a wide range, but this concentration should preferably lie between 0.1% and 3%. If desired, any other soluble dye conforming to the invention or any other dye known and used for dyeing keratinic fibers such as, for example, nitrated dyes and their substitution derivatives ar azo and anthraquinone dyes may be added to any of the soluble dyes according to the invention.

In the dyeing process according to the invention, the coloring compositions are preferably applied to the hair at room temperature. The pH of these coloring compositions is kept between 4 and 10, and preferably between 6 and 9.

In order that the invention may be clearly understood, several methods of synthesizing dyeing compositions according to the invention, and several methods of using such compositions to dye the hair will now be described, purely by way of illustration and example.

EXAMPLES OF PREPARATION

Example 1

Preparation of N-[(3-nitro-4-methylamino)-phenyl]-N' - (4' - nitro) - phenyl]ethylenediamine, having the formula:

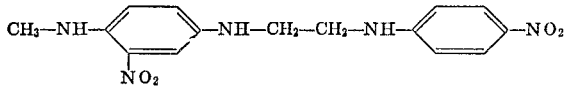

This product is obtained by condensing 4-nitro-N-benzenesulfonyl-1-N-β-bromoethylamino benzene (hereinafter called product $A_1$) with the potassium derivative of 1 - N - methylamino - 2-nitro-4-N'-benzenesulfonylamino benzene (hereinafter called product $B_1$).

($A_1$) is obtained by reacting 1,2-dibromo-ethane with the potassium derivative of para-nitro-N-benzenesulfonylaniline in dimethylformamide according to the process described in U.S. patent application Ser. No. 568,148, filed July 27, 1966, now abandoned. This product forms colorless crystals which, after recrystallization in acetic acid, melt at 165° C.

The potassium derivative ($B_1$) was also described in the U.S. patent aplication Ser. No. 568,148.

Step 1: Condensation.—The condensation of ($A_1$) on ($B_1$) is carried out by heating a mixture of 10 g. (that is 0.026 mole) of compound ($A_1$) and 9 g. (that is 0.026 mole) of compound ($B_1$) at 120° C. for 2 hours in 50 cm.³ of dimethylformamide. After cooling, the reaction mixture is poured into a mixture of ice and water, and the raw product which precipitates is dried.

The raw product thus obtained is purified by being washed with one half normal potash, followed by a washing with boiling water. 14.3 g. of N,N'-dibenzene-sulfonyl - N-[(3-nitro-4-methylamino)-phenyl]-N'-[(4'-nitro)-phenyl]ethylenediamine are obtained which, after recrystallization in toluene, melts at 177° C.

Analysis of the product yields the following results:

| Analysis | Calculated for $C_{27}H_{25}N_5O_8S_2$ | Found |
|---|---|---|
| Percent: | | |
| N | 11.45 | 11.31–11.26 |
| S | 10.47 | 10.60–10.45 |

Step 2: Hydrolysis.—3 g. (0.0049 mole) of dibenzenesulfonamide are dissolved in 18 cm.³ of concentrated sulfuric acid, and the mixture is left for 24 hours at the ambient temperature. It is then poured over ice. The sulfate of the desired product is thus obtained, which is then treated with an aqueous soda solution to obtain N-[(3-nitro - 4-methylamino)-phenyl]-N'-[(4'-nitro)-phenyl]ethylenediamine.

This product is purified by recrystallization in chlorobenzene. The resultant chestnut-violet crystals melt at 185.5° C.

Analysis of the product yields the following results:

| Analysis | Calculated for $C_{15}H_{17}N_5O_4$ | Found |
|---|---|---|
| Percent: | | |
| C | 54.38 | 54.47–54.44 |
| H | 5.13 | 5.35–5.17 |
| N | 21.14 | 21.17–21.04 |

Example 2

Preparation of N-[(3-nitro)-phenyl]-N'-methyl,N'-[(3'-nitro-4'-methylamino)-phenyl]ethylenediamine, having the formula:

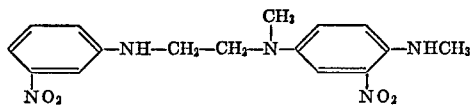

This dye is prepared according to the process used for the preparation of the dye in Example 1, by condensing 1 - N-methylamino-2-nitro-N'-methyl-4-N'-β-chloroethylamino benzene (hereinafter called product $A_2$) with the sodium derivative of 3-nitro-1-N-benzenesulfonyl-amino benzene (hereinafter called product $B_2$).

Compound ($A_2$) is described in U.S. patent application Ser. No. 568,118 filed July 27, 1966, now abandoned.

Compound ($B_2$) is prepared from 3-nitro-1-benzenesulfonylamino benzene (which melts at 134° C.) by reacting it with sodium ethoxide.

Step 1: Condensation.—The condensation is carried out as in Example 1, by heating equimolecular quantities of ($A_2$) and ($B_2$) in an exces of dimethylformamide at 120° C.

Step 2: Hydrolysis.—The raw product thus obtained is then hydrolyzed with concentrated sulfuric acid as in Example 1 and the desired base is separated from its sulfate by the means of an aqueous solution of sodium hydroxide.

The product thus obtained, after recrystallization in chlorobenzene, melts at 142.5° C.

Analysis of this product yields the following results:

| Analysis | Calculated for $C_{16}H_{19}N_5O_4$ | Found |
|---|---|---|
| Percent: | | |
| C | 55.65 | 55.46–55.53 |
| H | 5.51 | 5.29–5.48 |
| N | 20.28 | 20.50–20.30 |

Example 3

Preparation of N-[(2-nitro-4-amino)-phenyl]-N'-[(4'-nitrophenyl]ethylenediamine having the formula:

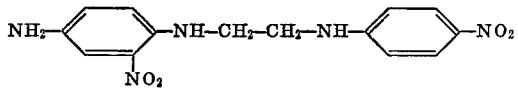

This dye is prepared by condensing 4-nitro-N-benzenesulfonyl-1-N-β-bromoethylamino benzene (hereinafter called product $A_1$) with the sodium derivative of 1-N-benzenesulfonyl-amino-2-nitro-4-acetamino benzene (hereinafter called product $B_3$), followed by a first cold hydrolysis with concentrated sulfuric acid to remove the benzenesulfonyl group and by a second hydrolysis with dilute hydrochloric acid for the acetyl group.

The preparation of compound ($A_1$) was described in Example 1. Compound ($B_3$) is obtained according to the process described in U.S. patent application Ser. No. 568,148, filed July 27, 1966.

Step 1: Condensation.—A mixture of 33.8 g. (0.087 mole) of ($A_1$) and 31.2 g. (0.087 mole) of ($B_3$) is heated at 120° C. for 2 hours in 150 cm.³ of dimethylformamide. After cooling, it is poured into a mixture of water and ice, then the raw product which forms is isolated.

This product is purified by treatment with a one-half normal sodium solution, followed by washing with boiling water to remove some of the original 1-N-benzenesulfonylamino-2-nitro-4-acetamino benzene. The unreacted ($A_1$) is then removed at a high temperature by successive extractions with cyclohexane.

36.6 g. of N,N'-dibenzenesulfonyl-N-[(2-nitro-4-acetamino)-phenyl]-N'-[(4'-nitro) - phenyl]ethylenediamine are obtained in the form of a thick oil.

Step 2: Hydrolysis.—3 g. of this compound are dissolved in 15 cm.³ of concentrated sulfuric acid and left for 24 hours at the ambient temperature. The mixture is then poured over ice and the precipitated product is dried.

1.2 g. of N-[(2-nitro-4-acetamino)]-phenyl-N'-[(4'-nitro)-phenyl]ethylenediamine is obtained, which melts at 247° C.

The hydrolysis is then carried out by heating to reflux with 20 cm.³ of concentrated hydrochloric acid; after cooling of the reaction mixture, the desired product, in the form of a hydrochloride, is dried. The base is freed by treatment with an aqueous solution of sodium hydroxide. 0.7 g. of N-[(2-nitro-4-amino)-phenyl]-N'-[(4'-nitro)-phenyl]ethylenediamine is dried, which, after recrystallisation in chlorobenzene, melts at 177° C. and takes the form of deep cheestnut crystals.

Analysis of the product yields the following results:

| Analysis | Calculated for $C_{14}H_{15}N_5O_4$ | Found |
|---|---|---|
| Percent: | | |
| C | 53.00 | 53.25–53.03 |
| H | 4.72 | 4.82–4.80 |
| N | 22.08 | 21.90–21.88 |

Example 4

Preparation of N-methyl-N-[(3-nitro-4-methylamino)-phenyl]-N'-[(3'-nitro-4'-methylamino) - phenyl]ethylenediamine having the formula:

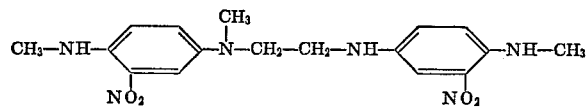

This dye is prepared by condensing 1-N-methylamino-2-nitro-N'-methyl-4-N'-β-chloroethylamino benzene (hereinafter called product $A_4$) with the potassium derivative of 1-N-methylamino-2-nitro-4-N' - benzenesulfonylamino benzene (hereinafter called product $B_4$), followed by a sulfuric hydrolysis.

The compound ($A_4$) is described in U.S. patent application Ser. No. 568,118, filed July 27, 1966, now abandoned. The compound ($B_4$) is described in the patent application Ser. No. 568,148, filed in the U.S. July 27, 1966.

Step 1: Condensation.—A mixture of 24.4 g. (0.1 mole) of ($A_4$) and 34.5 g. (0.1 mole) of ($B_4$) is heated for 2 hours in a boiling water bath in 100 cc. of dimethylformamide.

After cooling, it is poured into a solution of iced 2 N hydrochloric acid, and the raw product in the form of the hydrochloride is dried. This hydrochloride is treated with a 2 N solution of sodium hydroxide and 30 g. of N-[(3 - nitro - 4 - methylamino)-phenyl]-N-methyl-N'-benzenesulfonyl-N'-[(3'-nitro - 4' - methylamino)-phenyl]ethylenediamine are obtained by drying, which after recrystallization in methylisobutylketone, melt at 140° C.

Analysis of the product yields the following results:

| Analysis | Calculated for $C_{23}H_{26}O_6N_6S$ | Found |
|---|---|---|
| Percent: | | |
| N | 16.34 | 16.27–16.40 |
| S | 6.22 | 6.18–6.40 |

Step 2: Hydrolysis.—20 g. of this compound are dissolved in 100 cc. of concentrated sulfuric acid. The reaction mixture is left for 24 hours at the ambient temperature, then poured over ice. It is alkalized and 13 g. of N-[(3 - nitro-4-methylamino) - phenyl]-N-methyl-N'-[(3'-nitro - 4' - methylamino) - phenyl]ethylenediamine are obtained by drying which, after recrystallization in toluene, melt at 167° C.

Analysis of the product yields the following results:

| Analysis | Calculated for $C_{17}H_{22}N_6O_4$ | Found |
|---|---|---|
| Percent: | | |
| C | 54.54 | 54.69–54.68 |
| H | 5.88 | 5.88–5.90 |
| N | 22.46 | 22.40–22.22 |

Example 5

Preparation of N-[(2 - nitro - 4 - di-β-hydroxyethylamino) - phenyl]-N'-[4'-nitro)-phenyl]ethylenediamine, having the formula:

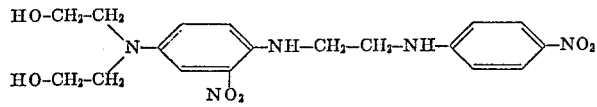

6.3 g. (0.02 mole) of N-[(2-nitro-4-amino)-phenyl]-N'-[(4' - nitro) - phenyl]ethylenediamine are heated to reflux with a solution of 14.3 g. (0.08 mole) of glycol bromohydrin in the presence of 4 g. of calcium carbonate for 2½ hours in a boiling water bath. At the end of the reaction, the reaction mixture is poured into a mixture of 150 g. of water and ice. The raw product thus precipitated is dried, and then dissolved at a high temperature in about 100 cm.³ of 3 N hydrochloric acid. The hydrochloride of the desired product is crystallized by cooling.

After drying, the desired base is recovered by alkalization with dilute ammonia. The precipitated base is dried, then recrystallized in a chloroform-alcohol mixture.

The product forms brown crystals which melt at 148° C.

Analysis of the product yields the following results:

| Analysis | Calculated for $C_{18}H_{23}N_5O_6$ | Found |
|---|---|---|
| Percent: | | |
| C | 53.33 | 55.50–53.48 |
| H | 5.68 | 5.80–5.52 |
| N | 17.29 | 17.22–17.11 |

Example 6

Preparation of iodide of N-[(2-nitro-4-β-diethylmethylammoniumethylamino) - phenyl]-N'-[(4' - nitro)-phenyl]ethylenediamine, having the formula:

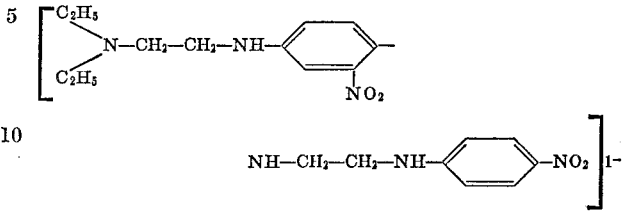

Step 1: Preparation of N-[(2 - nitro-4-benzenesulfonylamino) - phenyl] - N' - [(4'-nitro)-phenyl]ethylenediamine.—To a solution of 0.02 mole (6.3 g.) of N-(2-nitro-4-amino) - phenyl - N'-(4'-nitro)-phenyl ethylenediamine in 60 cm.³ of pyridine is added 0.022 mole of benzenesulfochloride; then the reaction mixture is kept at 45° C. for an hour. It is then poured into 60 cm.³ of concentrated hydrochloric acid mixed with 200 g. of crushed ice. 8.3 g. of a raw product is obtained by drying, which after recrystallization in pyridine mixed with an equal volume of water, melts at 130° C.

Analysis of the product yields this result:

| Analysis | Calculated for $C_{20}H_{19}N_5O_6S$ | Found |
|---|---|---|
| Percent: | | |
| N | 15.32 | 15.55–15.51 |
| S | 7.00 | 6.92–7.05 |

Step 2: Preparation of N-[(2-nitro-4-(benzenesulfonyl-β - diethylamino - ethyl)-amino)-phenyl]-N'-[(4'-nitro)-phenyl]-ethylenediamine.—Little by little 0.15 mole (7 g.) of the benzenesulfonamide obtained in Step 1 is added to 70 cm.³ of a normal sodium hydroxide solution at 80° C. so as to make it completely soluble. After cooling, 7.1 g. of the sodium derivative are obtained by drying.

This sodium derivative is dissolved in 70 cm.³ of dimethylformamide at 90° C. and 0.03 mole of diethylaminoethylchloride is rapidly added. After the reaction mixture has been kept at 90° C. for 10 minutes, it is poured into 100 cm.³ of ice water and the raw product is dried. This product is treated with 200 cm.³ of 0.25 N sodium hydroxide solution to remove the unreacted starting product. It is then washed with water and dried. 6 g. of N-[(2-nitro-4-(benzenesulfonyl - β - diethylaminoethyl) - amino - phenyl]-N'-[(4' - nitro)-phenyl]ethylenediamine are obtained.

Step 3: Preparation of N-[(2-nitro-4-β-diethylaminoethylamino)-phenyl-N'-[(4' - nitro) - phenyl]ethylenediamine.—0.01 mole (5.6 g.) of the previously prepared disubstituted benzenesulfonamide is dissolved in 28 cm.³ of concentrated sulfuric acid and the mixture is left at the ambient temperature for 3 hours.

The reaction mixture is poured over 300 cm.³ of ice, alkalized, and the N-[(2-nitro - 4 - β - diethylaminoethylamino)-phenyl]-N'-[(4'-nitro)-phenyl]ethylenediamine is extracted with methylisobutylketone.

The solvent is evaporated and the residue is dissolved in a boiling water bath in 100 cm.³ of a 2 N hydrochloric solution.

After cooling, 3.5 g. of the desired product are obtained by drying in the form of the dihydrochloride which, after recrystallization in 2 N hydrochloric acid, melts and decomposes at 125° C.

Step 4: Preparation of the iodide of [(2-nitro-4-β-diethyl - methyl - ammonium - ethylamino)-phenyl-N'-[(4'-nitro)-phenyl]ethylenediamine.—0.1 mole (4.2 g.) of N-[(2 - nitro - 4 - β - diethylaminoethylamino)-phenyl]-N'-[(4'-nitro)-phenylethylenediamine is dissolved in 60 cm.³ of chlorobenzene. 1.5 g. of methyl iodide is added and the reaction mixture is left at the ambient temperature for 5 hours. The quaternary is dried.

Example 7

Preparation of N-[(2-nitro - 4 - β - aminoethylamino)-phenyl)-N'-[(4' - nitro)-phenyl]ethylenediamine, having the formula:

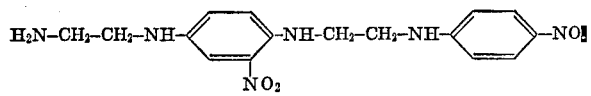

A mixture of 0.024 mole (7.65 g.) of N-[(2-nitro-4-amino)-phenyl]-N'-[(4' - nitro) - phenyl]ethylenediamine and 0.028 mole (5.75 g.) of the hydrobromide of β-bromoethylamine in 150 cm.³ of propanol and 15 cm.³ of water is heated in the presence of 1.4 g. of calcium carbonate in a boiling water bath for 7 hours. The boiling reaction mixture is dried and the filtrate is cooled. 6.6 g. of the raw product are obtained by drying in the form of monohydrobromide. It is redissolved in boiling water, filtered while hot, and alkalized with a sodium hydroxide solution. After cooling, 5.8 g. of N-[(2-nitro-4-β-aminoethylamino)-phenyl-N'-[(4' - nitro) - phenyl]ethylenediamine are obtained by drying.

This product is dissolved in hot 2 N hydrochloric acid. After cooling, the desired product is obtained by drying, in the form of its dihydrochloride. It melts and decomposes at 150° C.

Analysis of the product yields the following results:

| Analysis | Calculated for $C_{16}H_{22}N_6O_nCl_2, H_2O$ | Found |
|---|---|---|
| Percent: | | |
| C | 42.57 | 43.14–43.06 |
| H | 4.92 | 5.02–5.07 |
| N | 19.06 | 18.75–18.56 |

Example 8

Preparation of the iodide of N-[(3-nitro - 4 - methylamino)-phenyl]-N-β-[(3'-nitro - 4' - methylamino)-phenyl]aminoethyl-N,N-dimethylammonium. 5 g. of N-methyl-N-[(3-nitro - 4 - methylamino)-phenyl]-N'-[(3'-nitro-4'-methylamino)-phenyl]ethylenediamine are dissolved in 50 cm.³ of chlorobenzene. 2 g. of methyl iodide are added and the reaction mixture is kept at 50° C. for 10 hours. The quaternary which forms is then isolated.

Example 9

Preparation of 1-methylamino-4-γ-[(2'-nitro-5'-dimethylamino)-phenyl]-aminopropylamino anthraquinone, having the formula:

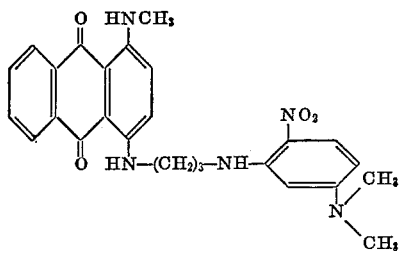

This product is prepared by condensing 1-methylamino-4-γ-aminopropyl-amino anthraquinone (hereinafter called product A₉) with 3,4-dinitro-N,N-dimethylaniline (hereinafter called product B₉).

Condensation A+B.—3.1 g. (0.01 mole) of 1-methylamino-4-γ-amino-propylamino anthraquinone are heated to reflux for ½ hour in 40 cm.³ of xylene with 1.1 g. (0.005 mole) of 3,4-dinitro-N,N-dimethylaniline. After cooling, 20 cm.³ of hexane are added and 2.9 g. of the raw product are obtained by drying.

Chromatographic study of this product indicates the presence of small amounts of the original anthraquinone derivative and of traces of the dinitro derivative.

In order to remove the original anthraquinone derivative, the raw product is washed with a normal hydrochloric acid solution. The traces of dinitro derivative are eliminated by transforming them to 1-N,N-dimethylamino-3-β-aminoethylamino-4-nitro benzene by heating the raw product with an excess of ethylene diamine. After the excess ethylene diamine has been evaporated under a vacuum, the product is washed with water, and then with a solution of normal hydrochloric acid until the wash water no longer has a yellow tint. 1.6 g. of the desired product are obtained, which melt at 227° C.

Example 10

Preparation of [1-methylamino - 4 - γ-[(2'-nitro-5'-trimethylammonium) - phenyl]aminopropylamino anthraquinone]methylsulfate, having the formula:

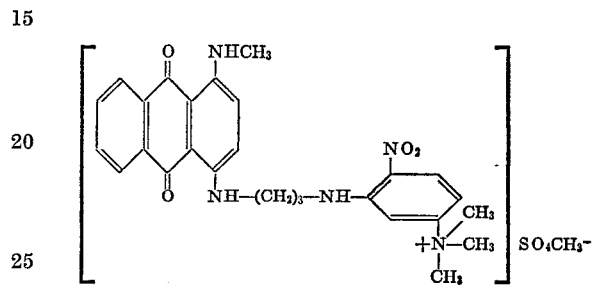

1.6 g. of the previously prepared 1-methylamino-4-γ-[(2' - nitro-5'-dimethylamino)-phenyl]aminopropylamino anthraquinone is dissolved under reflux in chlorobenzene. An excess of methyl sulfate is added and it is heated to reflux for ½ hour. After cooling, 2 g. of [1-methylamino-4-γ-[(2-nitro-5-trimethylammonium) - phenyl]aminopropylamino anthraquinone]methylsulfate are obtained by drying.

Example 11

Preparation of bromide of [N-γ-[(2-nitro-5-dimethylamino) - phenyl] - aminopropyl-β-N'-(paranitrophenyl)-aminoethyl-dimethylammonium] having the formula:

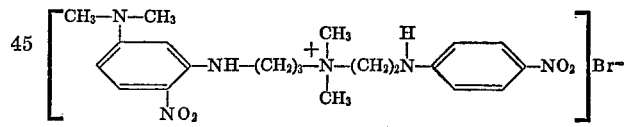

This product is prepared by condensing 1-N,N-dimethylamino - 3 - dimethylaminopropylamino-4-nitro benzene (hereinafter called product A₁₁) with 4-nitro-1-β-bromoethylamino benzene (hereinafter called product B₁₁).

The product (A₁₁) is described in U.S. patent application Ser. No. 598,179, filed Dec. 1, 1966, now abandoned.

The compound (B₁₁) is obtained by hydrolysis of 4-nitro-N-benzenesulfonyl-1-N-β-bromoethylamino benzene in concentrated sulfuric acid.

A mixture of 1.4 g. (0.005 mole) of (A₁₁) and 1.2 g. (0.005 mole) of (B₁₁) is heated to reflux for ½ hour in 10 cm.³ of chlorobenzene.

The quaternary, at first oily, is crystallized by cooling the reaction mixture. After recrystallization in boiling water, it melts with decomposition at 150° C.

Analysis of the product yields the following results:

| Analysis | Calculated for $C_{21}H_{31}N_6O_4Br$ | Found |
|---|---|---|
| Percent: | | |
| C | 49.31 | 49.12–49.20 |
| H | 6.06 | 6.26–6.29 |
| N | 16.43 | 16.25–16.30 |

Example 12
Preparation of N-[(3-nitro-4-methylamino)-phenyl]-N'-[(2'-nitro-4'-methoxy)-phenyl]ethylenediamine:

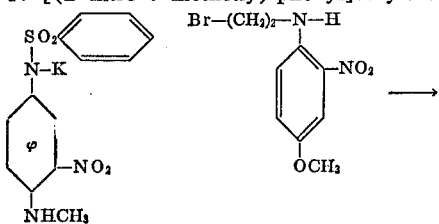

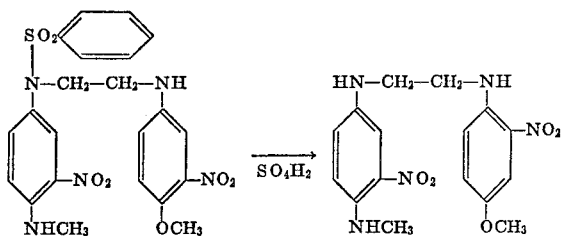

Step 1: Preparation of N-benzenesulfonyl-N-[(3-nitro-4-methylamino)-phenyl]-N'-[(2'-nitro-4'-methoxy)-phenyl]ethylenediamine.—0.61 mole (210 g.) of the potassium derivative of 1-N-methylamino-2-nitro-4-N'-benzenesulfonylamino benzene is dissolved in 850 cm.³ of dimethylformamide previously heated to 90° C. Little by little, while stirring, 0.61 mole (167 g.) of 1-methoxy-3-nitro-4-β-bromoethylamino benzene prepared according to the process described in U.S. patent application Ser. No. 568,148, filed on July 27, 1966, is added. The reaction mixture is kept at 90° C. for 20 minutes then cooled and poured into three liters of water. 300 g. of practically pure N-benzenesulfonyl-N-[(3-nitro-4-methylamino)-phenyl]-N'-[(2'nitro-4'methoxy)-phenyl]ethylenediamine are obtained by drying and, after recrystallization in a dioxane/alcohol mixture and drying in a vacuum at 80° C., melt at 115° C.

Step 2: Preparation of N-[(3-nitro-4-methylamino)-phenyl]-N'-[(2'-nitro-4'-methoxy)-phenyl]ethylenediamine.—Little by little, while stirring, 0.59 mole (300 g.) of N-benzenesulfonyl-N-[(3-nitro-4-methylamino)-phenyl]-N'-[(2'-nitro-4'-methoxy)-phenyl]ethylenediamine is added to 1200 cm.³ of sulfuric acid, the temperature being kept between 15 and 20° C. The reaction mixture is left at this temperature for 24 hours, then poured over 5 kg. of crushed ice. Drying yields the desired product in the form of a sulfate. This sulfate is treated with 600 cm.³ of pyridine at 60° C. while stirring. After cooling, drying and washing with water this yields 193 g. of N-[(3-nitro-4-methylamino)-phenyl]-N'-[(2'-nitro-4'-methoxy)-phenyl]ethylenediamine which, after recrystallization in chlorobenzene, melts at 152° C.

| Analysis | Calculated for $C_{16}H_{19}N_5O_5$ | Found |
|---|---|---|
| Percent: | | |
| C | 53.18 | 53.40–53.42 |
| H | 5.26 | 5.35–5.46 |
| N | 19.39 | 19.55–19.51 |

Example 13
Preparation of monohydrochloride of N-β-diethylaminoethyl-N-[(3-nitro-4-methylamino)-phenyl]-N'-[(2'-nitro-4'-methoxy)-phenyl]ethylenediamine:

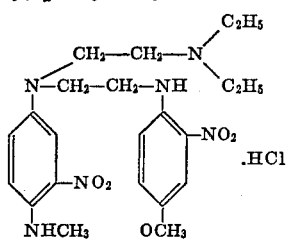

0.22 mole (79.5 g.) of N-[(3-nitro-4-methylamino)-phenyl]-N'-[(2'-nitro-4'-methoxy)-phenyl]ethylenediamine is dissolved to reflux in 600 cm.³ of chlorobenzene. Little by little, while stirring, 1.1 mole (149 g.) of diethylaminoethyl chloride is added and it is kept at reflux for four hours. It is cooled and 300 cm.³ of petroleum ether are added. Drying yields the desired monohydrochloride in an impure state. The raw product is recrystallized in chlorobenzene and 96 g. of pure monohydrochloride of N-β-diethylaminoethyl-N'-[(3-nitro-4-methylamino)-phenyl]-N'-[(2'-nitro-4'-methoxy)-phenyl]ethylenediamine are obtained. This product melts at 158° C.

| Analysis | Calculated for $C_{22}H_{33}N_6O_5Cl$ | Found |
|---|---|---|
| Percent: | | |
| C | 53.17 | 52.98–53.00 |
| H | 6.65 | 6.55–6.62 |
| Cl | 7.15 | 7.05–7.14 |

Example 14
Preparation of β-[N-[(3-nitro-4-methylamino)-phenyl]-N-β-N'-[(2'-nitro-4'-methoxy)-phenyl]-aminoethyl]-aminoethyl-methyl-diethylammonium methylsulfate having the formula:

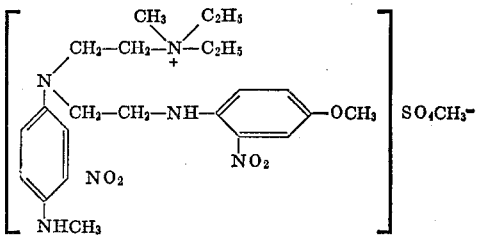

0.2 mole (92 g.) of N-β-diethylaminoethyl-N-[(3-nitro-4-methylamino)-phenyl]-N'-[(2'-nitro-4'-methoxy)-phenyl]ethylenediamine isolated in the usual manner from the previously obtained monohydrochloride is dissolved in 200 cm. of chlorobenzene at the ambient temperature. Little by little, while cooling, 0.24 mole (30.24 g.) of methyl sulfate is added. After 15 minutes, drying yields 115 g. of the desired pure quaternary salt, which melts at 124° C.

Example 15
Preparation of N-β-diethylaminoethyl-N-[(3-nitro-4-methylamino)-phenyl]-N'-[(4'-nitro)-phenyl]ethylenediamine:

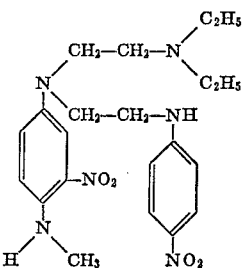

This product is obtained by condensing diethylaminoethylchloride on the N-[(3-nitro-4-methylamino)-phenyl]-N'-[(4'-nitro)-phenyl]ethylenediamine described in Example 1.

0.3 mole (99 g.) of N-[(3-nitro-4-methylamino)-phenyl]-N'-[(4'-nitro)-phenyl]ethylenediamine is dissolved under reflux in two liters of chlorobenzene. Little by little, while stirring, 1.5 mole (203 g.) of diethylaminoethyl chloride is added and the reflux is maintained for four hours. The reaction mixture is cooled and the raw product, in the form of a monohydrochloride, is obtained by drying. The impure monohydrochloride is dissolved in 750 cm.³ of 4 N hydrochloric acid at 50° C. After cooling, drying yields the practically pure product in the form of dihydrochloride. This dihydrochloride, after treatment with 700 cm.³ of a normal sodium hydroxide solution, yields 90 g. of N-β diethylaminoethyl-N-[(3-nitro-4-methylamino)-phenyl]-N'-[(4'-nitro)-phenyl]ethylenediamine, which after recrystallization in ethyl alcohol, melts at 132° C.

| Analysis | Calculated for C₂₁H₃₀N₆O₄ | Found |
|---|---|---|
| Percent: | | |
| C | 58.60 | 58.37–58.57 |
| H | 6.97 | 7.20–6.98 |
| N | 19.53 | 19.73–19.59 |

Example 16

Preparation of β-[N-[(3-nitro-4-methylamino)-phenyl]-N-β'-N'-[(4'-nitro)-phenyl] - aminoethyl] - aminoethyl-methyl-diethylammonium methylsulfate having the formula:

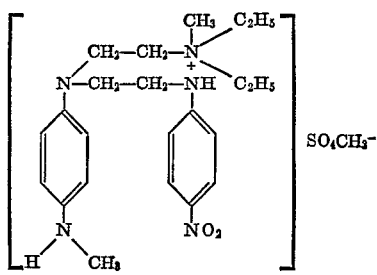

0.14 mole (60 g.) of N-β-diethylaminoethyl-N-[(3-nitro-4-methylamino)-phenyl]-N'-[4'-nitro) - phenyl]ethylenediamine is dissolved in 600 cm.³ of chlorobenzene at 50° C. Little by little, while stirring, 0.18 mole (17 cm.³ of methyl sulfate is added and the reaction mixture is kept at 50° C. for one hour. Drying yields 78 g. of the desired quaternary salt which melts at 158° C.

Example 17

Preparation of dihydrochloride of N-[(3-nitro-4-β-aminoethylamino)-phenyl]-N'-[(4'-nitro) - phenyl]ethylenediamine:

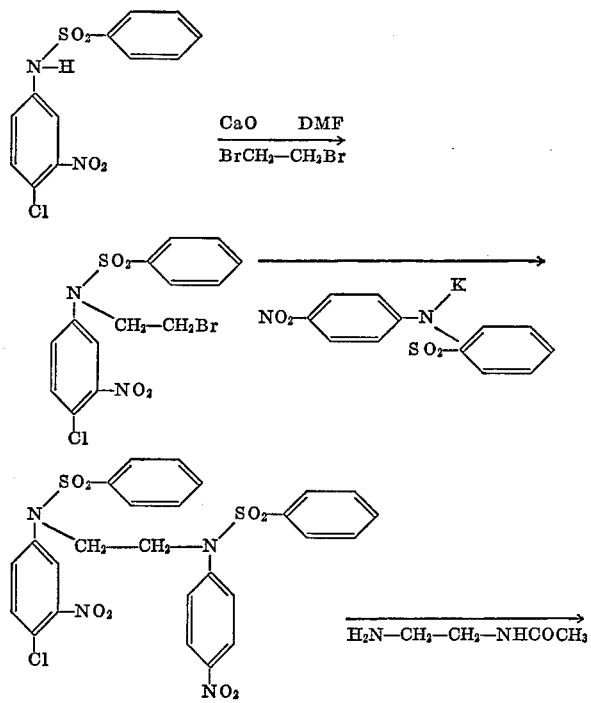

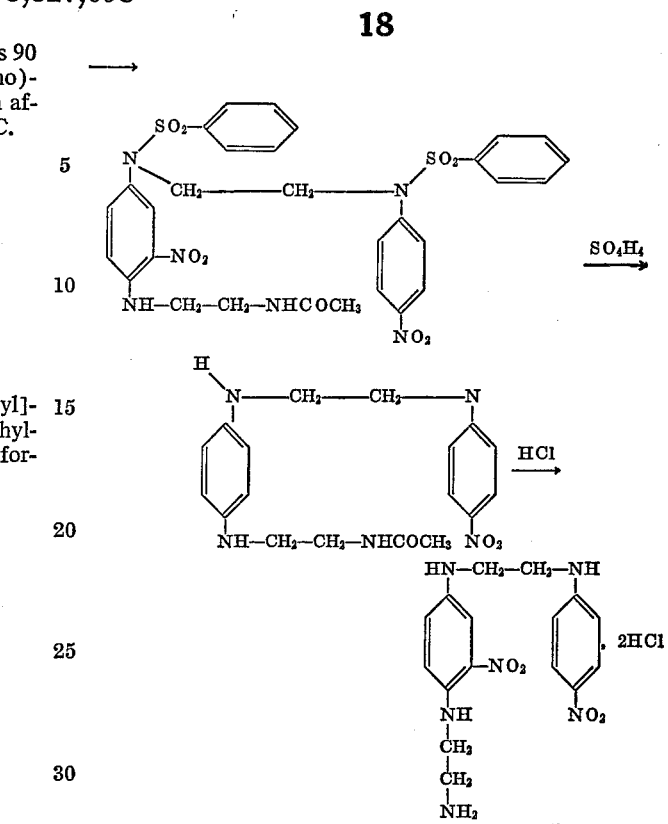

Step 1: Preparation of 2-nitro-N-benzenesulfonyl-4-N-β-bromoethylamino chlorobenzene.—0.5 mole (156.25 g.) of 2-nitro-4-N-benzenesulfonylamino chlorobenzene is dissolved in 935 cm.³ of dimethylformamide previously heated to 95° C. 1.25 mole (70 g.) of quicklime is added, then very quickly 1.25 mole (216 cm.³) of dibromoethane. After an hour of heating in a boiling water bath, the hot reaction mixture is filtered. One liter of ice water is added to the cooled filtrate. A very thick oil precipitates. The supernatant liquid is removed, the oil is dissolved in a mixture of water and alcohol, and drying yields 180 g. of crystallized 2-nitro-N-benzenesulfonyl-4-N-β-bromoethylamino chlorobenzene, which melts at 80° C.

Step 2: Preparation of N,N'-benzenesulfonyl-N-[(3-nitro-4-chloro)-phenyl]-N'-[(4' - nitro) - phenyl]ethylenediamine.—0.05 mole (20.97 g.) of 2-nitro-N-benzenesulfonyl-4-N-β-bromoethylamino chlorobenzene is dissolved in 150 cm.³ of dimethylformamide previously heated to 120° C. 0.1 mole (31.6 g.) of the potassium derivative of N-benzenesulfonyl-p.nitraniline is added and the reaction mixture is kept at 120° C. for an hour, then filtered while hot. 150 cm.³ of water are added to the cooled filtrate. A thick oil precipitates. The supernatant solution is decanted, the residue is dissolved in a mixture of acetone and alcohol and drying yields 17 g. of the desired product which is washed first with a normal sodium hydroxide solution, then with water. After recrystallization in acetic anhydride, 15 g. of pure N,N'-benzenesulfonyl-N-[(3-nitro-4-chloro) - phenyl]-N'-[(4'-nitro) - phenyl]ethylenediamine are obtained, which melts at 198° C.

| Analysis | Calculated for C₂₆H₂₁S₂O₈N₄Cl | Found |
|---|---|---|
| Percent: | | |
| N | 9.08 | 9.12–9.02 |
| S | 10.38 | 10.38–10.47 |

Step 3: Preparation of N,N'-benzenesulfonyl-N-[(3-nitro-4 - β-acetaminoethylamino)-phenyl]-N'-[(4'-nitro)-phenyl]ethylenediamine.—0.01 mole (6.16 g.) of N,N'-benzenesulfonyl - N - [(3-nitro-4-chloro)-phenyl]-N'-[(4'-nitro)-phenyl]ethylenediamine is heated in 0.1 mole (10 g.) of ethylene diamine monoacetate at 140° C. for two hours. The reaction mixture is poured into 100 cm.³ of ice water. It is dried and washed first with a normal hydrochloric solution, then with water and finally with a little alcohol. 4.2 g. of the desired product, which ,after recrystallization in a water and acetic acid mixture, melts at 185° C., are obtained.

| Analysis | Calculated for $C_{30}H_{30}N_6O_3S_2$ | Found |
|---|---|---|
| Percent: | | |
| N | 12.31 | 12.34–12.47 |
| S | 9.39 | 9.56–9.56 |

Step 4: Preparation of N-[(3-nitro-4-β-acetaminoethylamino)-phenyl]-N'-[(4'-nitro)-phenyl]ethylenediamine.—0.01 mole (6.82 g.) of N,N'-benzenesulfonyl-N-[(3-nitro-4-β-acetaminoethylamino)-phenyl]-N'-[(4'-nitro)-phenyl]ethylenediamine is dissolved in 35 cm.³ of concentrated sulfuric acid at between 15 and 20° C. The reaction mixture is kept at this temperature for 24 hours, then it is poured over ice. Drying yields the desired product as a sulfate. This sulfate, when treated with a 2 N sodium hydroxide solution, yields 3.4 g. of the corresponding base in the form of a chestnut colored product which is dried. This raw product is purified by being dissolved in hot 2 N hydrochloric acid and by crystallization by cooling of the monohydrochloride of N-[(3-nitro-4-β-acetaminoethylamino)-phenyl]-N'-[(4'-nitro)-phenyl]ethylenediamine. The corresponding base is released by a sodium hydroxide solution. After recrystallization in a mixture of chlorobenzene and nitrobenzene it melts at 156° C.

| Analysis | Calculated for $C_{18}H_{22}N_6O_5$ | Found |
|---|---|---|
| Percent: | | |
| C | 53.73 | 53.71–53.91 |
| H | 5.47 | 5.63–5.44 |
| N | 20.89 | 20.68–20.65 |

Step 5: Preparation of dihydrochloride of N-[(3-nitro-4-β-aminoethylamino)-phenyl]-N'-[(4'-nitro)-phenyl]ethylenediamine.—0.02 mole (8.04 g.) of N-[(3-nitro-4-β-acetaminoethylamino)-phenyl]-N'-[(4'-nitro)-phenyl]ethylenediamine is added to 35 cm.³ of concentrated hydrochloric acid. It is heated to reflux for three hours and cooled. 45 cm.³ of absolute alcohol are added and drying yields the desired product.

Example 18

Preparation of N-[(4-nitro-3-dimethylamino)-phenyl]-N'-[(3'-nitro-4'-methylamino)-phenyl]ethylenediamine:

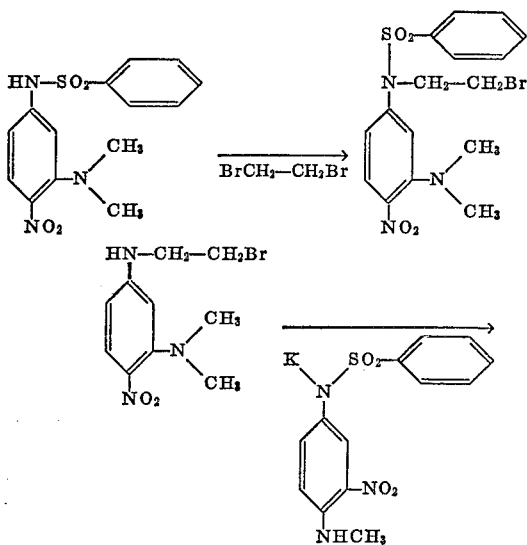

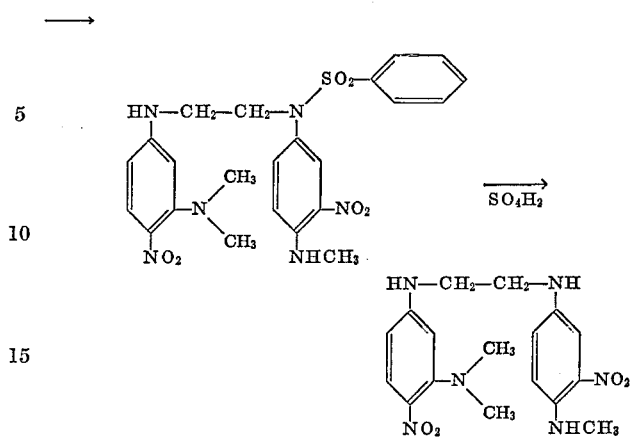

Step 1: Preparation of N-benzenesulfonyl-1-amino-3-dimethylamino-4-nitro benzene.—0.1 mole (18.1 g.) of 1-amino-3-dimethylamino-4-nitro benzene is dissolved in 90 cm.³ of pyridine at 45° C. Little by little 0.11 mole (14 cm.³) of benzenesulfochloride is added. The reaction mixture is kept at 45° C. for 2 hours, then poured into 450 cm.³ of ice water and acidified to pH=6 by using hydrochloric acid. Drying yields 30.7 g. of the desired product, which melts at 153° C.

Step 2: Preparation of N-benzenesulfonyl-1-N-β-bromoethylamino-3-dimethylamino-4-nitro benzene.—0.05 mole (16.05 g.) of benzenesulfonyl-1-amino-3-dimethylamino-4-nitro benzene is dissolved in 80 cm.³ of dimethylformamide which has been heated to 95° C. 0.25 mole (14 g.) of quicklime is added and then, very quickly, 0.15 mole (13 cm.³) of 1,2-dibromoethane. After an hour of heating in a boiling water bath, the reaction mixture is filtered while hot, 400 cm.³ of ice water are added to the cooled filtrate and drying yields 18.3 g. of practically pure N-benzenesulfonyl-1-N-β-bromoethylamino-3-dimethylamino-4-nitro benzene which, after recrystallization in benzene, melts at 121° C.

| Analysis | Calculated for $C_{16}H_{18}N_3BrSO_4$ | Found |
|---|---|---|
| Percent: | | |
| N | 9.81 | 10.01–9.95 |
| S | 7.47 | 7.41–7.66 |

Step 3: Preparation of 1-N-β-bromoethylamino-3-dimethylamino-4-nitro benzene.—0.16 mole (68.48 g.) of N-benzenesulfonyl-1-N-β-bromoethylamino-3-dimethylamino-4-nitro benzene is dissolved in 205 cm.³ of concentrated sulfuric acid, the temperature being kept at about 30° C. When the dissolution is complete, the reaction mixture is left at the ambient temperature for three hours, then poured into 1500 cm.³ of ice water and alkalized with a 5 N sodium hydroxide solution. The desired product is extracted with ethyl acetate, the solvent is evaporated in a vacuum and 43.7 g. of 1-N-β-bromoethylamino-3-dimethylamino-4-nitro benzene are obtained as a thick red oil.

Step 4: Preparation of N-[(4-nitro-3-dimethylamino)-phenyl]-N'-benzenesulfonyl-N'-[(3'-nitro-4'-methylamino)-phenyl]ethylenediamine.—0.152 mole (52.5 g.) of the potassium derivative of 1-N-methylamino-2-nitro-4-N'-benzenesulfonylamino benzene is dissolved in 90 cm.³ of dimethylformamide. 0.152 mole (43.63 g.) of 1-N-β-bromoethylamino-3-dimethylamino-4-nitro benzene in solution in 90 cm.³ of dimethylformamide is added. The reaction mixture is heated to 80° C. for one hour then cooled and poured into two liters of ice water. Drying yields 65 g. of the desired product which, after washing with water, and then with a 0.5 N sodium hydroxide solution, then with water again, melts at 138° C.

Step 5: Preparation of N-[(4-nitro-3-dimethylamino)-phenyl]-N'-[(3'-nitro-4'-methylamino) - phenyl]ethylenediamine.—0.067 mole (34.5 g.) of N-[(4-nitro-3-dimethylamino)-phenyl]-N'-benzenesulfonyl-N'-[(3' - nitro-4'-methylamino)-phenyl]ethylenediamine is dissolved in 85 cm.³ of concentrated sulfuric acid between 35° and 40° C. The reaction mixture is kept at this temperature for five hours, then left at the ambient temperature for 24 hours. It is poured over 600 g. of ice. Next it is alkalized with a sodium hydroxide solution. Drying yields the raw product. After being washed with boiling alcohol, this raw product yields 18 g. of practically pure N-[(4-nitro-3-dimethylamino)-phenyl]-N'-[(3'-nitro-4' - methylamino)-phenyl]ethylenediamine which, after recrystallization in chlorobenzene, melts at 172° C.

| Analysis | Calculated for $C_{17}H_{22}N_6O_4$ | Found |
|---|---|---|
| Percent: | | |
| C | 54.54 | 54.63–54.52 |
| H | 5.88 | 5.84–5.91 |
| N | 22.46 | 22.60–22.41 |

Example 19

Preparation of monohydrochloride of 1-methylamino-4 - γ - [(2'-nitro-N-ethyl-5'-N-β-aminoethylamino)-phenyl]aminopropylamino anthraquinone:

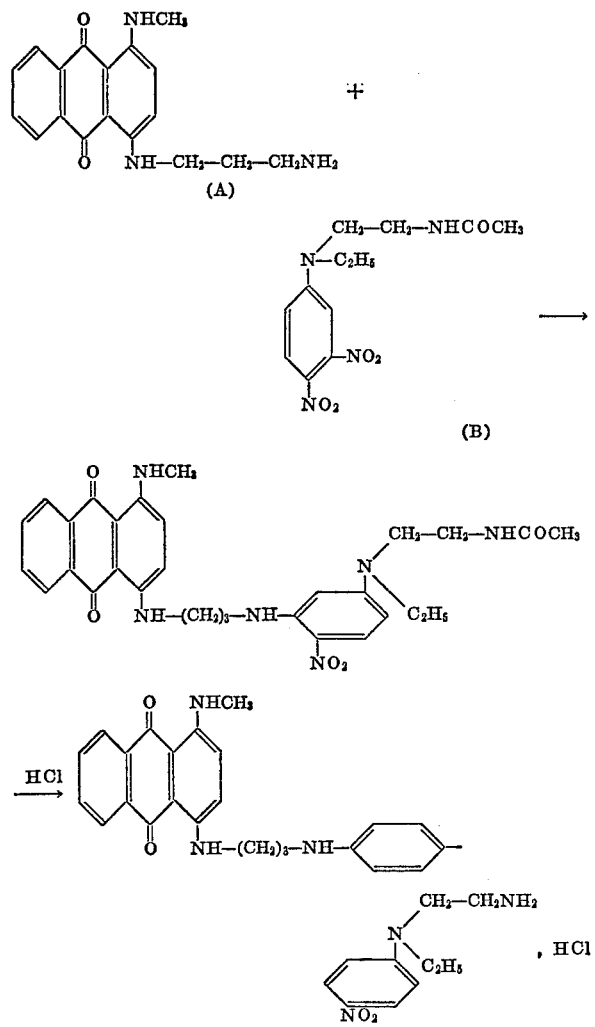

Step 1: Preparation of 1-methylamino-4-γ-[(2'-nitro-N - ethyl - 5'-N-β-acetaminoethylamino)-phenyl]aminopropylamino anthraquinone 0.01 mole (3.1 g.) of 1-methylamino-4-γ-aminopropylamino anthraquinone and 0.005 mole (1.48 g.) of 3,4-dinitro-N-ethyl-N-β-acetaminoethyl aniline (melting point=129° C.), obtained by dinitration of N-ethyl-N-β-acetaminoethyl aniline with a sulfonitric mixture, are heated to reflux for one hour in 20 cm.³ of pyridine. After cooling, drying yields the raw product which is washed with normal hydrochloric acid solution to remove the original anthraquinonic derivative. 1.7 g. of the practically pure desired product are obtained.

Step 2: Preparation of monochlorohydrate of 1-methylamino - 4-γ-[(2'-nitro-N-ethyl-5'-N-β-aminoethylamino)-phenyl]aminopropylamino anthraquinone.—0.003 mole (1.67 g.) of 1-methylamino-4-γ-[(2'-nitro-N-ethyl-5'-N-β - acetaminoethylamino)-phenyl]aminopropylamino anthraquinone is heated to reflux in 20 cm.³ of concentrated hydrochloric acid for three hours. After the reaction mixture has been cooled, 100 cm.³ of acetone are added and drying yields 0.8 g. of the desired monochlorohydrate.

Examples 20 and 21

Preparation of N,N'-[(2-nitro-4-amino)-phenyl]tetramethylene diamine and of N,N'-[(2-nitro-4-di-β-hydroxyethylamino)phenyl]tetramethylenediamine:

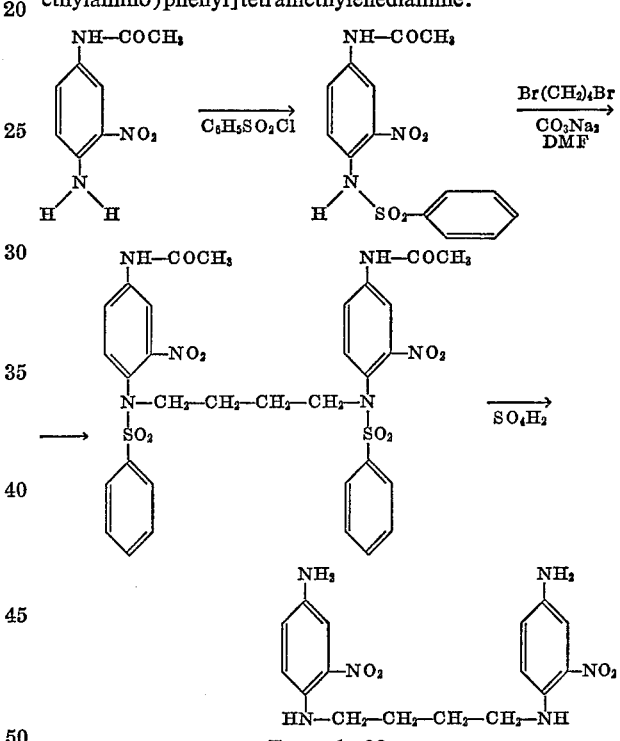

Example 20

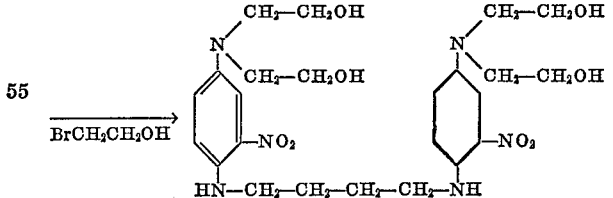

Example 21

Example 20.—Preparation of N,N'-[(2-nitro-4-amino)-phenyl]tetramethylenediamine:

Step 1: Preparation of 1-benzenesulfonylamino-2-nitro-4-acetamino benzene.—This product is prepared in the usual way by reacting benzenesulfochloride with 1-amino-2-nitro-4-acetamino benzene in solution in pyridine. After recrystallization in alcohol it melts at 199°.

Step 2: Preparation of N,N'-benzenesulfonyl-N,N'-[(2-nitro - 4 - acetamino)-phenyl]tetramethylene-diamine.—2 moles (670 g.) of 1-benzenesulfonyl-amino-2-nitro-4-acetamino benzene are dissolved in two liters of dimethylformamide which has first been heated to 120°. 3 moles (318 g.) of anhydrous sodium carbonate and then, drop by drop, 1.5 moles (179 cm.³) of 1,4-dibromo-butane are added to the reaction mixture while the temperature is kept at 120°. After two hours of heating, it is cooled and diluted 5 times with water. Drying yields the raw product, which is washed with two liters of boiling acetic acid. Drying now yields 694 g. of practically pure N,N'-benzenesulfonyl - N,N' - [(2 - nitro - 4 - acetamino)phenyl]tetramethylenediamine which melts and decomposes at 296°.

Step 3: Preparation of N,N'-[(2-nitro-4-amino)-phenyl]tetramethylenediamine.—Little by little, with stirring, at between 0 and 10°, 0.95 mole (696 g.) of N,N'-benzenesulfonyl - N.N' - [(2 - nitro - 4 - acetamino) - phenyl]tetramethylenediamine is added to 2435 cm.³ of concentrated sulfuric acid.

The reaction mixture in left at the ambient temperature for two hours, then 4850 cm.³ of ice water are added carefully so that the temperature does not surpass 95°. N,N'-[(2-nitro-4-acetamino)phenyl]tetramethylenediamine precipitates. This product is not isolated, but rather its suspension in dilute sulfuric acid is heated for three hours in a boiling water bath. After cooling, drying yields the desired product as a sulfate. After treatment with an ammoniacal solution, this sulfate yields 283 g. of N,N'-[(2-nitro-4-amino)-phenyl]tetramethylenediamine, which, after recrystallization in nitrobenzene and drying in a vacuum at 100° melts at 240°.

| Analysis | Calculated for $C_{16}H_{20}N_6O_4$ | Found |
|---|---|---|
| Percent: | | |
| C | 53.33 | 53.45–53.45 |
| H | 5.56 | 5.41–5.43 |
| N | 23.33 | 23.46–23.21 |

Example 21.—Step 4: Preparation of N,N'-[(2-nitro-4 - di. - β-hydroxyethylamino) - phenyl]tetramethylenediamine: 0.7 mole (250 g.) of N,N'-[(2-nitro-4-amino)-phenyl]tetramethylenediamine, prepared as in Example 1, and 5.6 moles (1 kg.) of 70% glycol bromohydrin with 250 cm.³ of water, 250 cm.³ of ethanol and 2.8 moles (280 g.) of calcium carbonate are heated for two hours in a boiling water bath. After cooling the reaction mixture is poured into 2.5 liters of 4 N hydrochloric acid and cooled to 0°. Drying yields the desired product as a dihydrochloride. After treatment with an ammoniacal solution, this dihydrochloride yields 283 g. of N,N'-[(2-nitro-4-di-β-hydroxymethylamino) - phenyl]tetramethylenediamine which, after recrystallization in a mixture of ethyl alcohol and methylisobutylketone melts at 144°.

| Analysis | Calculated for $C_{24}H_{36}N_6O_8$ | Found |
|---|---|---|
| Percent: | | |
| C | 53.73 | 53.61–53.76 |
| H | 6.71 | 6.91–6.71 |
| N | 15.67 | 15.53–15.59 |

Examples 22 and 23

Preparation of N,N'-[(2-nitro-4-amino)-phenyl]ethylenediamine and of N,N'-[(2-nitro-4-di-β-hydroxyethylamino)-phenyl]ethylenediamine;

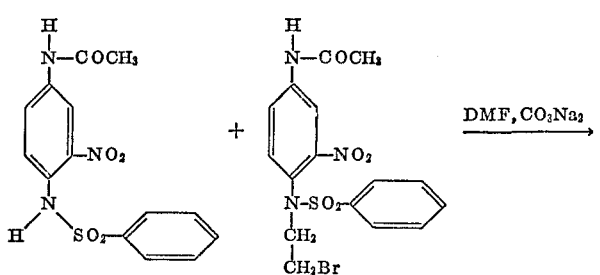

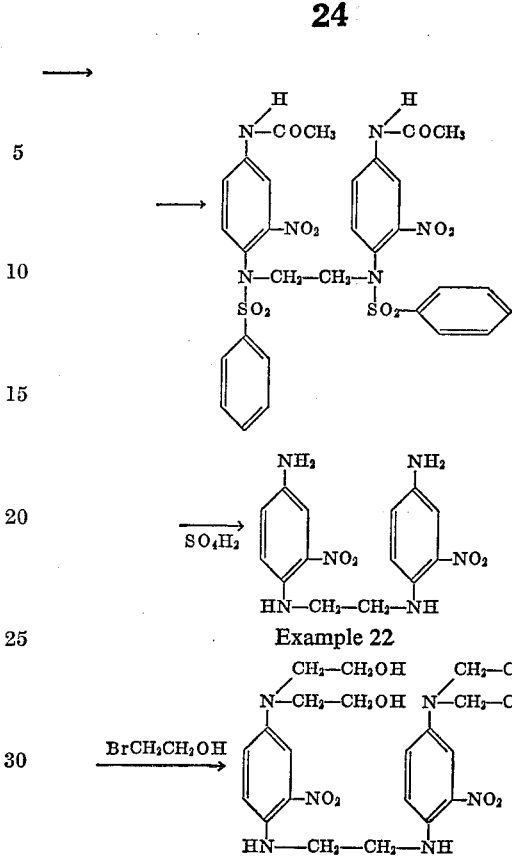

Example 22

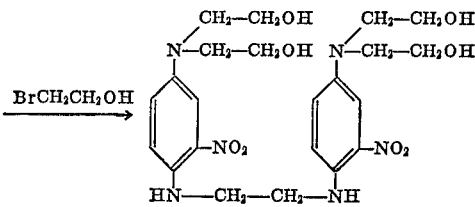

Example 23

Example 22.—Preparation of N,N'-[(2-nitro-4-aminophenyl]ethylenediamine:

Step 1: Preparation of 1-(N-benzenesulfonyl-N-β-bromoethyl)-amino-2-nitro-4-acetamino benzene.—0.7 mole (234.5 g.) of 1-benzenesulfonyl-amino - 2 - nitro-4-acetamino benzene is added, while stirring, to 1250 cm.³ of water containing 0.7 mole (39.2 g.) of lime. It is stirred for three hours and drying yields the calcium derivative which is dried in a vacuum at 50°.

The calcium derivative thus obtained is dissolved in 1200 cm.³ of dimethylformamide previously heated in a boiling water bath. As rapidly as possible, while stirring, 1.4 mole (263 g.) of 1,2-dibromo ethane is added and the reaction mixture is kept in a boiling water bath for two hours. After cooling and addition of two liters of water, drying yields 290 g. of 1-(N-benzenesulfonyl-N-β-bromoethyl)-amino-2-nitro-4-acetamino benzene, which, after treatment with an 0.5 N sodium hydroxide solution to remove a little of the original product, washing with water, drying, and recrystallization in acetic acid, melts at 153°.

| Analysis | Calculated for $C_{16}H_{16}O_5N_3SBr$ | Found |
|---|---|---|
| Percent: | | |
| C | 43.43 | 43.65–43.64 |
| H | 3.61 | 3.72–3.59 |
| N | 9.50 | 9.76–9.50 |

Step 2: Preparation of N,N'-benzenesulfonyl-N,N'-[(2-nitro-4-acetamino)-phenyl]ethylenediamine. — 0.15 mole (50.25 g.) of 1-benzenesulfonyl-amino-2-nitro-4-acetamino benzene is dissolved in 450 cm.³ of dimethylformamide previously heated to 90°. 0.0225 mole (23.85 g.) of anhydrous sodium carbonate, then 0.15 mole (66.3 g.) of 1 - (N - benzenesulfonyl -N- β - bromoethyl) - amino - 2 - nitro-4-acetamino benzene are added. The reaction mixture is heated to 120° for three hours, then cooled and poured into two liters of ice water. After drying and washing first in a 1 N sodium hydroxide solution, then in water, 64 g. of a raw product are obtained which, after recrystallization in a mixture of acetic acid and water, and then in acetic acid, yields 40 g. of practically pure N,N'-benzenesulfonyl - N,N' - [(2-nitro - 4 - acetamino)-phenyl]ethylenediamine, which melts at 248°.

Step 3: Preparation of N,N'-[(2-nitro-4-amino)-phenyl]ethylenediamine.—0.09 mole (62.64 g.) of N,N'-benzenesulfonyl - N,N' - [(2 - nitro - 4 - acetamino) - phenyl]ethylenediamine is dissolved in 250 cm.³ of concentrated surfuric acid at 25°. The reaction mixture is left at this temperature for two hours, then 500 cm.³ of ice water are added with care, so that the temperature of the mixture does no surpass 95°. The red-orange N,N'-[(2-nitro-4-acetamino) - phenyl]ethylenediamino precipitates. This product is not isolated but is instead suspended in dilute sulfuric acid and heated in a boiling water bath for three hours. After cooling, drying yields the desired product as a yellow sulfate. After treatment with an ammoniacal solution, this sulfate yields 28 g. of N,N'-[(2-nitro-4-amino)-phenyl]ethylenediamine which, after recrystallization in nitrobenzene and drying in a vacuum at 100°, melts at 235°.

| Analysis | Calculated for $C_{14}H_{16}N_6O_4$ | Found |
|---|---|---|
| Percent: | | |
| C | 50.60 | 50.40-50.50 |
| H | 4.82 | 4.96-4.85 |
| N | 19.28 | 19.47-19.33 |

Example 23.—Step 4: Preparation of N,N'-[(2-nitro-4-di-β-hydroxyethylamino)-phenyl]ethylenediamine: 0.01 mole (3.2 g.) of N,N'-[(2 - nitro-4-amino)-phenyl]ethylenediamine and 0.08 mole (14.3 g. to 70%) of glycol bromohydrin with 3 cm.³ of water, 3 cm.³ of alcohol and 0.04 mole (4 g.) of calcium carbonate are heated for two hours in a boiling water bath. The reaction mixture is cooled, then poured into 30 cm.³ of 5 N hydrochloric acid cooled in a mixture of ice and salt. About 1 g. of a hydrochloride which is not the desired product is removed by filtration. The filtrate is alkalized with an ammoniacal solution and drying yields 2.5 g. of N,N'-[(2-nitro - 4 - di-β-hydroxyethylamino) - phenyl]ethylenediamine which, after recrystallization in a mixture of ethanol and water, melts at 196°.

| Analysis | Calculated for $C_{22}H_{32}N_6O_8$ | Found |
|---|---|---|
| Percent: | | |
| C | 51.97 | 52.17-52.19 |
| H | 6.30 | 6.55-6.41 |
| N | 16.53 | 16.39-16.29 |

Examples 24 and 25

Preparation of N,N'-[(3 - nitro-4-methylamino)-phenyl]tetramethylenediamine and of tetrachlorohydrate of N,N'-β - diethylaminoethyl - N,N' - [(3-nitro-4-methylamino)-phenyl]tetramethylenediamine:

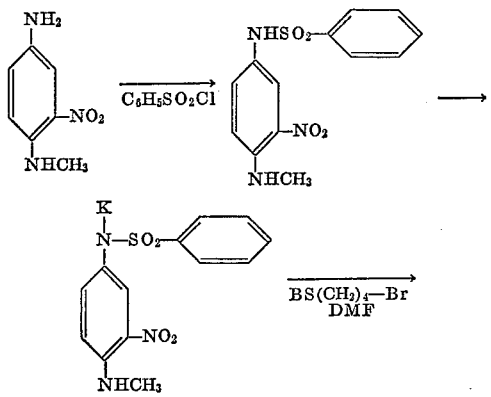

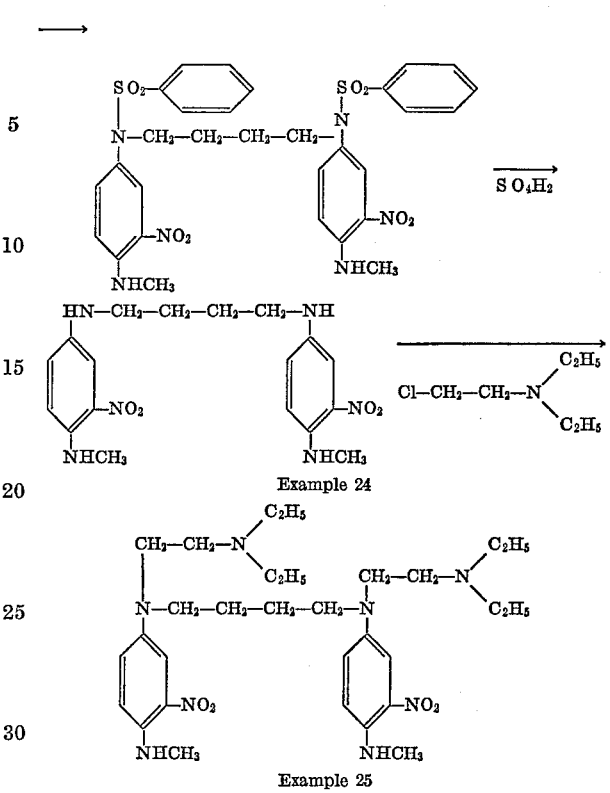

Example 24.—Preparation of N,N'-[(3 - nitro-4-methylamino)-phenyl]tetramethylenediamine:

Step 1: Preparation of N,N'-benzene sulfonyl-N,N'-[(3 - nitro - 4 - methylamino) - phenyl]tetramethylenediamine.—0.6 mole (207 g.) of the potassium derivative of 1-N-methylamino - 2 - nitro-4-N'-benzenesulfonylamino benzene, prepared as described in U.S. patent application Ser. No. 568,148, filed July 27, 1966, is dissolved in 600 cm.³ of dimethylformamide previously heated to 95°. While the reaction mixture is kept at this temperature, 0.315 mole (37.6 g.) of 1,4-dibromobutane is added drop by drop. The mixture is heated for another 45 minutes and cooled. Drying yields 170 g. of N,N'-benzenesulfonyl-N,N'-[(3 - nitro-4-methylamino)-phenyl]tetramethylenediamino which after recrystallization in dimethylformamide, melts at 245°.

| Analysis | Calculated for $C_{30}H_{32}O_8N_6S_2$ | Found |
|---|---|---|
| Percent: | | |
| C | 53.88 | 53.78-53.70 |
| H | 4.79 | 4.93-4.97 |
| N | 12.27 | 12.45-12.40 |

Step 2: Preparation of N,N'-[(3-nitro-4-methylamino)-phenyl]tetramethylenediamine.—0.252 mole (168 g.) of N,N' - benzene-sulfonyl-N,N'-[(3-nitro-4-methylamino)-phenyl]tetramethylenediamine is dissolved in 750 cm.³ of concentrated sulfuric acid cooled in an ice bath. When dissolution is complete, the reaction mixture is left at the ambient temperature for 24 hours, then poured over 8 kg. of ice. Drying yields the desired product which has precipitated as a sulfate. This sulfate is treated with 500 cm.³ of pyridine in a boiling water bath. After cooling, drying and washing with water, 89 g. of N,N'-[(3-nitro-4-methylamino) - phenyl]tetramethylenediamine are obtained which, after recrystallization in pyridine, melts at 210°.

Example 25.—Step 3: Preparation of the tetrahydrochloride of N,N'-β-diethylaminoethyl - N,N'-[(3-nitro-4-methylamino)-phenyl]tetramethylene diamine: 0.245 mole (95 g.) of N,N'-[(3-nitro-4-methylamino)-phenyl]tetramethylenediamine is dissolved to reflux in 950 cm.³ of chlorobenzene. Little by little, 2.45 moles (332 g.) of diethylaminoethylchloride are added and the reaction mixture is kept at reflux for three hours. It is cooled to 0° and rapid drying yields the desired product as an impure dihydrochloride. This raw product is redissolved in 2 N sodium hydroxide and the desired product is extracted with methylisobutylketone. The methylisobutylketone solution is dried on sodium sulfate, filtered, and evaporated in a vacuum. The oily residue is dissolved in propanol. After bubbling gaseous hydrochloric acid through the iced propanolic solution, drying yields 111 g. of tetrahydrochloride of N,N'-β-diethylaminoethyl - N,N' - [(3-nitro-4-methylamino)-phenyl] tetramethylenediamine which, after recrystallization in a mixture of ethanol and concentrated hydrochloric acid, melts and decomposes at about 150°.

| Analysis | Calculated for $C_{30}H_{54}O_4N_8Cl_4$ | Found |
|---|---|---|
| Percent: | | |
| C | 49.18 | 49.27–49.20 |
| H | 7.38 | 7.68–7.50 |
| N | 15.30 | 15.14–15.22 |

EXAMPLE 26

Preparation of N,N' - [(3-nitro-4-β-aminoethylamino)-phenyl]tetramethylenediamine:

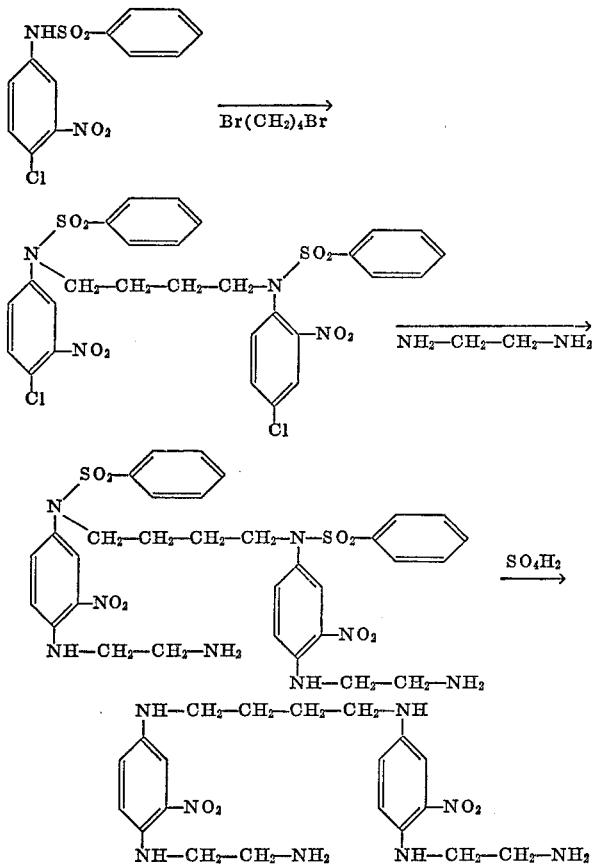

Step 1: Preparation of N,N'-benzenesulfonyl-N,N'-[(3-nitro - 4 - chloro) - phenyl]tetramethylenediamine.—0.16 mole (50 g.) of 2-nitro-4-benzenesulfonylamino chlorobenzene is dissolved in 400 cm.³ of dimethylformamide previously heated in a boiling water bath; 0.4 mole (23.6 g.) of 95% quicklime is added, then, drop by drop, while keeping the reaction mixture in the boiling water bath, 0.14 mole (16.7 cm.³) of 1,4-dibromo butane. After two hours of heating, it is cooled and 100 cm.³ of water are added. Drying yields 40 g. of N,N'-benzenesulfonyl-N,N'-[(3-nitro-4-chloro)-phenyl]tetramethylenediamine which, after recrystallization in acetic acid, melts at 193°.

| Analysis | Calculated for $C_{28}H_{24}O_8N_4S_2Cl_2$ | Found |
|---|---|---|
| Percent: | | |
| N | 8.25 | 8.39–8.49 |
| S | 9.42 | 9.47–9.32 |

Step 2: Preparation of N,N'-benzenesulfonyl-N,N'-[(3-nitro - 4 - β-aminoethylamino)-phenyl]tetramethylenediamine.—0.027 mole (18.3 g.) of N,N'-benzenesulfonyl-N,N'-[(3 - nitro - 4 - chloro) - phenyl]tetramethylenediamine is dissolved in 0.44 mole (37 cm.³) of ethylenediamine monohydrate previously heated to 95°. The reaction mixture is kept in a boiling water bath for 30 minutes, then cooled and poured into 350 cm.³ of water while stirring. Drying, washing with water and drying in a vacuum yield 20 g. of N,N'-benzenesulfonyl-N,N'-[(3-nitro - 4 - β-aminoethylamino)-phenyl]tetramethylenediamine which, after recrystallization in propanol and drying in a vacuum at 90°, melts at 160°.

| Analysis | Calculated for $C_{32}H_{38}O_8N_8S_2$ | Found |
|---|---|---|
| Percent: | | |
| N | 15.43 | 15.45–15.60 |
| S | 8.83 | 8.81–8.93 |

Step 3: Preparation of N,N'-[(3-nitro-4-β-aminoethylamino)-phenyl]tetramethylenediamine: 0.161 mole (117 g.) of N,N'-benzenesulfonyl - N,N' - [(3-nitro-4-β-aminoethylamino) - phenyl]tetramethylenediamine is added to 1170 cm.³ of 48% hydrobromic acid and heated to reflux for 45 minutes. The reaction mixture is cooled to −10° and 1000 cm.³ of absolute ethanol are added. Drying yields 68 g. of the desired product as a tetrahydrobromide. This tetrahydrobromide is treated with a 2 N sodium hydroxide solution. Drying, washing with water, and drying in a vacuum at 90° yields N,N'-[(3-nitro-4-β-aminoethylamino)-phenyl]tetramethylenediamine which, after recrystallization in chlorobenzene, melts at 195°.

| Analysis | Calculated for $C_{20}H_{30}N_8O_4$ | Found |
|---|---|---|
| Percent: | | |
| C | 53.81 | 54.00–53.92 |
| H | 6.73 | 6.76–6.69 |
| N | 25.11 | 25.30–25.28 |

Examples 27 and 28

Preparation of N,N'-[(3-nitro-4-β-hydroxyethylamino)-phenyl]tetramethylenediamine and of N,N'-[(3-nitro-4-β-hydroxyethylamino) - phenyl]-N,N'-β-hydroxyethyl tetramethylenediamine:

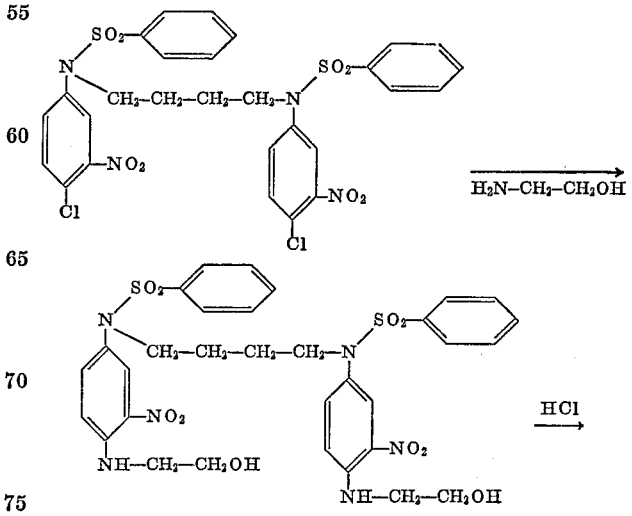

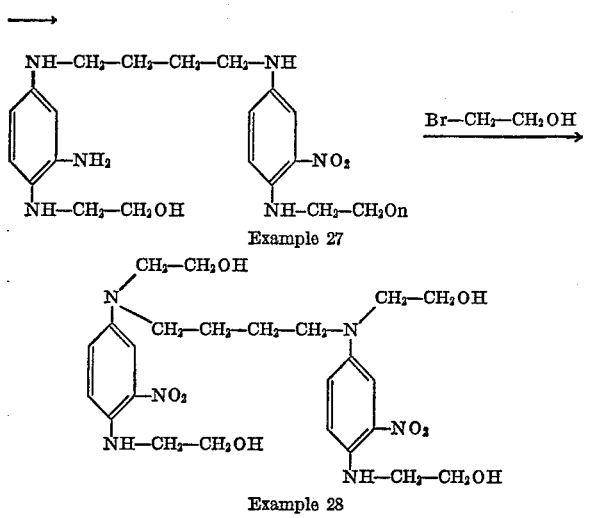

Example 27

Example 28

Example 27.—Preparation of N,N'-[(3-nitro - 4 - β-hydroxyethylamino)-phenyl]tetramethylenediamine:

Step 1: Preparation of N,N'-benzenesulfonyl-N,N'-[(3-nitro-4 - β - hydroxyethylamino)-phenyl]tetramethylenediamine.—0.256 mole (174 g.) of N,N'-benzenesulfonyl-N,N'-[(3-nitro-4-chloro) - phenyl]tetramethylenediamine, prepared as in the preceeding example, is added while stirring to 7.68 moles (468 g.) of ethanolamine previously heated to 120°, the addition being regulated to keep the reaction between 120 and 130°, the reaction being exothermic. When the addition is finished, the reaction mixture is cooled and poured into three liters of water. The desired product is dried, washed with a normal hydrochloric solution, then with water and dried in a vacuum at 90°. After recrystallization in dioxane and drying in a vacuum at 90°, it melts at 165°.

| Analysis | Calculated for $C_{32}H_{38}O_{10}N_6S_2$ | Found |
|---|---|---|
| Percent: | | |
| N | 11.53 | 11-63–11.61 |
| S | 8.79 | 8.80–8.93 |

Step 2: Preparation of N,N'-[(3-nitro-4-β-hydroxyethylamino)-phenyl]tetramethylenediamine.—Little by little, with stirring, 0.2 mole (152 g.) of N,N'-benzenesulfonyl-N,N'-[(3-nitro - 4 - β-hydroxyethylamino)-phenyl]tetramethylenediamine is dissolved in 1500 cm.³ of concentrated hydrochloric acid previously heated to 85°. The reaction mixture is heated for 45 minutes in a boiling water bath, then cooled to —10°. Drying yields the desired product as a hydrochloride. After treatment with an ammoniacal solution, this hydrochloride yields 68 g. of N,N'-[(3-nitro-4 - β - hydroxyethylamino)-phenyl]tetramethylenediamine which, after recrystallization in nitrobenzene and drying in a vacuum, melts at 210°.

| Analysis | Calculated for $C_{20}H_{28}O_6N_6$ | Found |
|---|---|---|
| Percent: | | |
| C | 53.57 | 53–67–53.70 |
| H | 6.25 | 6.09–6.13 |
| N | 18.75 | 18.70–18.75 |

Example 28.—Step 3: Preparation of N,N'-[(3-nitro-4-β-hydroxyethylamino)-phenyl]-N,N'-β-hydroxyethyl tetramethylenediamine.—0.1 mole (44.8 g.) of N,N'-[(3-nitro-4-β-hydroxyethylamino) - phenyl]tetramethylenediamine and 0.8 mole (108 g.) of glycol bromohydrin, with 20 cm.³ of water, 25 cm.³ of ethanol and 40 g. of calcium carbonate, are heated for two hours in a boiling water bath. The mixture is cooled, and 400 cm.³ of water are added. A thick oil precipitates. The supernatant liquid phase is decanted and the oil is dissolved in 500 cm.³ of chloroform. The chloroform solution is carefully washed with water, dried on sodium sulfate, filtered, cooled to 0°, and saturated with dry hydrochloric acid. Drying yields 56 g. of the desired product as a dihydrochloride. After treatment with a 1 N sodium hydroxide solution this dihydrochloride yields N,N'-[(3-nitro - 4 - β-hydroxyethylamino)-phenyl] - N,N' - β-hydroxyethyl tetramethylenediamine as a thick oil which crystallizes easily in a mixture of chloroform and methanol. After recrystallization in this same mixture of solvents the product melts at 108°.

| Analysis | Calculated for $C_{24}H_{36}N_6O_6$ | Found |
|---|---|---|
| Percent: | | |
| C | 53.73 | 53.77–53.77 |
| H | 6.71 | 6.68–6.54 |
| N | 15.67 | 15.58–15.65 |

Examples 29–31

Example 12 is repeated except that the 1-methoxy-3-nitro-4-β-bromoethylamino benzene is replaced with equivalent amounts of 1-ethoxy-3-nitro-4-β-bromoethylamino benzene,
1-propoxy-3-nitro-4-β-bromoethylamino benzene, and
1-butoxy-3-nitro-4-β-bromoethylamino benzene, to produce, respectively:

N-benzenesulfonyl-N-[(3-nitro-4-methylamino) - phenyl]-N'-[(2'-nitro-4'-ethoxy)-phenyl]ethylenediamine.
N-benzenesulfonyl-N-[(3-nitro-4-methylamino) - phenyl]-N'-[(2'-nitro-4'-propoxy)-phenyl]ethylenediamine, and
N-benzenesulfonyl-N-[(3-nitro-4-methylamino) - phenyl]-N'-[(2'-nitro-4'-butoxy)-phenyl]ethylenediamine.

Each of the above ethylene diamines is treated in accordance with the procedures outlined in Step 2 of Example 12 to produce respectively, N-[(3-nitro-4-methylamino)-phenyl] - N' - [2'-nitro - 4'-ethoxy)-phenyl]ethylenediamine,
N-[(3-nitro-4-methylamino)-phenyl] - N' - [2'-nitro - 4'-propoxy)-phenyl]ethylenediamine, and
N-[(3-nitro-4-methylamino)-phenyl] - N' - [2'-nitro - 4'-butoxy)-phenyl]ethylenediamine.

Examples 32–34

Example 4 is repeated except that the 1-N-methylamino-2-nitro-4-N'-benzenesulfonylamino benzene is replaced with an equivalent amount of:

1-N-ethylamino-2-nitro-4-N' - benzenesulfonylamino benzene,
1-N-propylamino-2-nitro-4-N'-benzenesulfonylamino benzene, and
1-N-butylamino-2-nitro-4-N' - benzenesulfonylamino benzene, to produce, respectively:

N-methyl-N-[(3-nitro-4-methylamino)-phenyl]-N' - [(3'-nitro-4'-ethylamine)-phenyl]ethylenediamine,
N-methyl-N-[(3-nitro-4-methylamino)-phenyl]-N' - [(3'-nitro-4'-propylamino)-phenyl]ethylenediamine, and
N-methyl-N-[(3-nitro-4-methylamino)-phenyl]-N' - [(3'-nitro-4'-butylamino)-phenyl]ethylenediamine.

Examples 35–37

Example 32 is repreated except that the 1-N-methylamino-2-nitro-N'-methyl-4-N'-β-chloroethylamino benzene is replaced with an equivalent amount of:

1-N-ethylamino-2-nitro-N'-methyl-4-N' - β - chloroethylamino benzene, and
1-N-propylamino-2-nitro-N'-methyl-4-N' - β - chloroethylamino benzene, and 1-N-butylamino-2-nitro-N'-methyl-4-N' - β - chloroethylamino benzene, to produce, respectively:

N-methyl-N-[3-nitro-4-ethylamino) - phenyl] - N' - [(3'-nitro-4'-ethylamino)-phenyl]ethylenediamine,
N-methyl-N-[(3-nitro-4-propylamino)-phenyl] - N' - [(3'-nitro-4'-ethylamino)-phenyl]ethylenediamine, and
N-methyl-N-[(3-nitro-4-butylamino)-phenyl] - N' - [(3'-nitro-4'-ethylamino)-phenyl]ethylenediamine.

Examples 38–40

Examples 27 and 28 were repeated except that in Step 1 of Example 27, the ethanolamine is replaced with an equivalent amount of:

methanolamine,
propanolamine, and
butanolamine, to produce, respectively:

(a) N,N' - benzenesulfonyl - N,N'-[(3-nitro-4-β-hydroxymethylamino)-phenyl]tetramethylenediamine,
(b) N,N' - benzenesulfonyl - N,N'-[(3-nitro-4-β-hydroxypropylamino)-phenyl]tetramethylenediamine, and
(c) N,N' - benzenesulfonyl - N,N'-[(3-nitro-4-β-hydroxybutylamino)-phenyl]tetramethylenediamine.

Each of the tetramethylenediamines in (a)–(c) above were then reacted as set forth in Step 2 of Example 27 to produce, respectively (d) N,N' - [(3 - nitro-4-β-hydroxymethylamino)-phenyl] tetramethylenediamine,
(e) N,N' - [(3 - nitro-4-β-hydroxymethylamino)-phenyl] tetramethylenediamine, and
(f) N,N' - [(3 - nitro-4-β-hydroxymethylamino)-phenyl] tetramethylenediamine.

Then, each of the tetramethylene diamines in (d)–(f) above were treated as disclosed in Example 28 except that for diamine (e), an equivalent amount of propanol rather than 25 cm.³ of ethanol was used and for diamine (f) an equivalent amount of butanol rather than 25 cm.³ of ethanol was employed to produce, respectively, (g) N,N'-[(3-nitro-4-β-hydroxymethylamino) - phenyl]-N,N'-β-hydroxyethyl tetramethylenediamine,
(h) N,N'-[(3-nitro-4-β-hydroxypropylamino) - phenyl]-N,N'-β-hydroxypropyl tetramethylenediamine, and
(i) N,N'-[(3-nitro-4-β-hydroxybutylamino) - phenyl]-N,N'-β-hydroxybutyl tetramethylenediamine.

Examples 41–43

Example 26 is repeated except that for the ethylene diamine used in Step 2, the following diamines are employed: methylene diamine, propylene diamine and butylene diamine. The resulting products are then treated as outlined in Step 3 of Example 26, producing respectively:

N,N'-[(3-nitro-4-aminomethylamino) - phenyl]tetramethylene diamine,
N,N' - [(3 - nitro - 4 - γ-aminopropylamino)-phenyl]tetramethylene diamine, and
N,N'-[(3-nitro-4-Δ-aminobutylamino) - phenyl]tetramethylene diamine.

Examples 44–45

Example 9 is repeated except that for the 1-methylamino - 4-γ-aminopropylamino anthraquinone there are used the following anthraquinones:

1-propylamino-4-γ-aminopropylamino anthraquinone, and
1-butylamino-4-N-aminopropylamino anthraquinone to produce respectively:

1-propylamino-4-γ-[2'-nitro - 5' - dimethylamino)-phenyl]-aminopropylamino anthraquinone, and
1-butylamino-4-γ-[(2'-nitro - 5'-dimethylamino)-phenyl]-aminopropylamino anthraquinone.

Examples 46–48

Example 9 is repeated except that for the 3,4-dinitro-N,N-dimethylaniline there is employed:

3,4-dinitro-N,N-diethyl aniline,
3,4,-dinitro-N,N-dibutyl aniline, and
3,4,-dinitro-N-methly N-butyl aniline, to produce, respectively:

1-methylamino-4-γ-[(2'-nitro - 5'-diethylamino)-phenyl]-aminopropylamino anthraquinone,
1-methylamino-4-γ-[(2'-nitro - 5'-dibutylamino)-phenyl]-aminopropylamino anthraquinone, and
1-methylamino-4-γ-[(2'-nitro-5'-methylbutylamino)-phenyl]-aminopropylamino anthraquinine.

What is claimed is:

1. A dye composition for coloring keratinic fibers comprising an aqueous solution of a dye having the formula

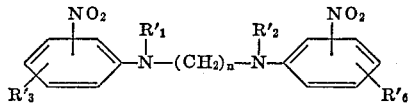

wherein $R'_1$ and $R'_2$ each independently are selected from the group consisting of hydrogen, lower alkyl, hydroxy lower alkyl and lower alkyl amino lower alkyl, $R'_3$ is selected from the group consisting of hydrogen, lower alkoxy and

wherein $R'_4$ and $R'_5$ each independently represent a member selected from the group consisting of hydrogen, lower alkyl, hydroxy lower alkyl, lower alkylamino lower alkyl and amino lower alkyl, $R'_6$ is selected from the group consisting of hydrogen, lower alkoxy, and

wherein $R'_7$ and $R'_8$ each independently represent a member selected from the group consisting of hydrogen( lower alkyl, hydroxy lower alkyl and amino lower alkyl, and $n$ is 2–4, said dye being present in amounts of about 0.1–3 weight percent of said composition.

2. The dye composition of claim 1 having a pH between 6–9 inclusive.

3. A method for dyeing human hair comprising impregnating said hair with an effective amount of an aqueous solution of a dye having the formula

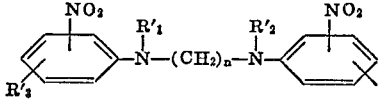

wherein $R'_1$ and $R'_2$ each independently are selected from the group consisting of hydrogen, lower alkyl, hydroxy lower alkyl, and lower alkyl amino lower alkyl, $R'_3$ is selected from the group consisting of hydrogen and

wherein $R'_4$ and $R'_5$ each independently represent a member selected from the group consisting of hydrogen, lower alkyl, hydroxy lower alkyl, lower alkylamino lower alkyl and amino lower alkyl, $R'_6$ is selected from the group consisting of hydrogen, lower alkoxy and

wherein R'₇ and R'₈ each independently represent a member selected from the group consisting of hydrogen, lower alkyl, hydroxy lower alkyl and amino lower alkyl, and $n$ is 2–4, said dye being present in amounts of about 0.1–3 weight percent of said composition, leaving said composition on the hair for a period of about 5–30 minutes at a temperature between 15–35° C., rinsing, washing and drying said hair.

4. A dye composition for coloring keratinic fibers comprising an aqueous solution of a dye having the formula

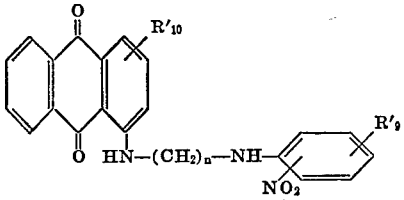

wherein R'₁₀ is

wherein $r''$ and $r'''$ each independently are selected from the group consisting of hydrogen and lower alkyl having 1–4 carbon atoms and R'₉ is

wherein R₁₂ and R'₁₁ each independently are selected from the group consisting of lower alkyl having 1–4 carbon atoms, and amino lower alkyl having 1–4 carbon atoms and $n$ is 2–4, said dye being present in amounts of about 0.1–3 weight percent of said composition.

5. The dye composition of claim 4 having a pH between 6–9 inclusive.

6. A method for dyeing human hair comprising impregnating said hair with an effective amount of an aqueous solution of a dye having the formula

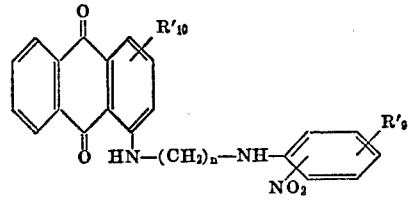

wherein R'₁₀ is

wherein $r''$ and $r'''$ each independently are selected from the group consisting of hydrogen and lower alkyl having 1–4 carbon atoms and R'₉ is

wherein R₁₂ and R₁₁ each independently are selected from the group consisting of lower alkyl having 1–4 carbon atoms, and amino lower alkyl having 1–4 carbon atoms and $n$ is 2–4, said dye being present in amounts of about 0.1–3 weight percent of said composition, leaving said composition on the hair for a period of about 5–30 minutes at a temperature between 15–35° C., rinsing, washing and drying said hair.

7. A dye composition for coloring keratinic fibers comprising an aqueous solution of a mono-quaternary ammonium salt of a quaternating agent selected from the group consisting of lower alkyl halide and alkyl sulfate and a dye having the formula

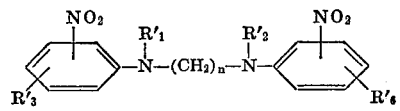

wherein R'₁ and R'₂ each independently are selected from the group consisting of hydrogen, lower alkyl, hydroxy lower alkyl and lower alkyl amino lower alkyl, R'₃ is selected from the group consisting of hydrogen, lower alkoxy and

wherein R'₄ and R'₅ each independently represent a member selected from the group consisting of hydrogen, lower alkyl, hydroxy lower alkyl, lower alkylamino lower alkyl and amino lower alkyl, R'₆ is selected from the group consisting of hydrogen, lower alkoxxy and

wherein R'₇ and R'₈ each independently represent a member selected from the group consisting of hydrogen, lower alkyl, hydroxy lower alkyl and amino lower alkyl, and $n$ is 2–4, said dye being present in amounts of about 0.1–3 weight percent of said composition.

8. A method for dyeing human hair comprising impregnating said hair with an effective amount of an equeous solution of a mono-quaternary ammonium salt of a quaternating agent selected from the group consisting of lower alkyl halide and alkyl sulfate and a dye having the formula

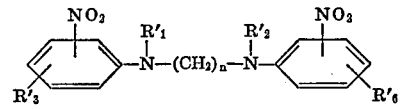

wherein R'₁ and R'₂ each independently are selected from the group consisting of hydrogen, lower alkyl, hydroxy lower alkyl and lower alkyl amino lower alkyl, R'₃ is selected from the group consisting of hydrogen, lower alkoxy and

wherein R'₄ and R'₅ each independently represent a member selected from the group consisting of hydrogen, lower alkyl, hydroxy lower alkyl, lower alkylamino lower alkyl and amino lower alkyl, R'₆ is selected from the group consisting of hydrogen, lower alkoxy and

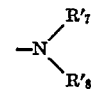

wherein R'₇ and R'₈ each independently represent a member selected from the group consisting of hydrogen, lower alkyl, hydroxy lower alkyl and amino lower alkyl, and $n$ is 2–4, said dye being present in amounts of about 0.1–3 weight percent of said composition, leaving said composition on the hair for a period of about 4–30 minutes at a temperature between 15–35° C., rinsing, washing and drying said hair.

9. A dye composition for coloring keratinic fibers comprising an aqueous solution of a monoquaternary ammonium salt of a quaternating agent selected from the group consisting of lower alkyl halide and alkyl sulfate and a dye having the formula

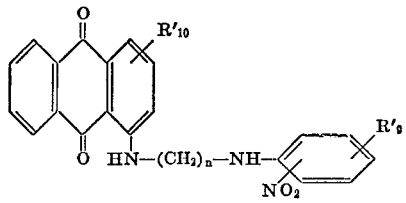

wherein $R'_{10}$ is

wherein $r''$ and $r'''$ each independently are selected from the group consisting of hydrogen and lower alkyl having 1-4 carbon atoms and $R'_9$ is

wherein $R_{12}$ and $R'_{11}$ each independently are selected from the group consisting of lower alkyl having 1-4 carbon atoms, and amino lower alkyl having 1-4 carbon atoms and $n$ is 2-4, said dye being present in amounts of about 0.1-3 weight percent of said composition.

10. A method for dyeing human hair comprising impregnating said hair with an effective amount of an aqueous solution of a monoquaternary ammonium salt of a quaternating agent selected from the group consisting of lower alkyl halide and alkyl sulfate and a dye having the formula

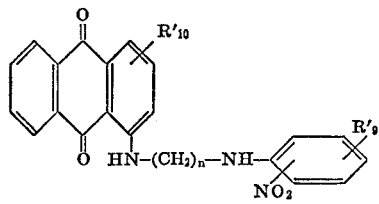

wherein $R'_{10}$ is

wherein $r''$ and $r'''$ each independently are selected from the group consisting of hydrogen and lower alkyl having 1-4 carbon atoms and $R'_9$ is

wherein $R_{12}$ and $R'_{11}$ each independently are selected from the group consisting of lower alkyl having 1-4 carbon atoms and amino lower alkyl having 1-4 carbon atoms and $n$ is 2-4, said dye being present in amounts of about 0.1-3 weight percent of said composition, leaving said composition on the hair for a period of about 5-30 minutes at a temperature between 15-35° C., rinsing, washing and drying said hair.

11. A dye composition for coloring keratinic fibers comprising an aqueous solution of a monoquaternary ammonium salt of a dye having the formula

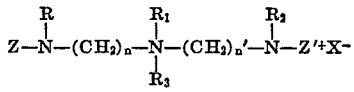

wherein Z and Z' represent a member selected from the group consisting of dimethylamino nitrophenyl and nitrophenyl, R, $R_1$, $R_2$ and $R_3$ each independently are selected from the group consisting of hydrogen and lower alkyl having up to 4 carbon atoms, $n$ and $n'$ are each independently an integer between 2 and 6 and X is halogen, said dye being present in amounts of about 0.1-3 weight percent of said composition.

References Cited
UNITED STATES PATENTS

| | | | |
|---|---|---|---|
| 3,100,739 | 8/1963 | Kaiser et al. | 8—10.1 |
| 3,123,605 | 3/1964 | Turetzky et al. | 260—378 X |
| 3,168,441 | 2/1965 | Bil et al. | 8—10.1 |
| 3,232,934 | 2/1966 | Hoare | 260—378 X |
| 3,401,003 | 9/1968 | Boosen et al. | 8—10.1 |
| 3,412,130 | 11/1968 | Schafer et al. | 260—570.5 PA |
| 3,442,599 | 5/1969 | Kalopissis et al. | 8—10.1 |
| 3,446,568 | 5/1969 | Holtzman et al. | 8—10 |

STANLEY J. FRIEDMAN, Primary Examiner

U.S. Cl. X.R.

8—10, 39, 40; 260—378, 570.5 P, 570.8 R

UNITED STATES PATENT OFFICE
CERTIFICATE OF CORRECTION

Patent No. 3,817,698                    Dated June 18, 1974

Inventor(s) Gregoire Kalopissis; Andree Bugaut and Hubert Gaston-Breton

It is certified that error appears in the above-identified patent and that said Letters Patent are hereby corrected as shown below:

In the Heading:

Please add the following --

Claim priority, applications Luxembourg, July 25, 1966, 51630; July 6, 1967, 54037; and July 7, 1967, 54049. --

Signed and sealed this 3rd day of December 1974.

(SEAL)
Attest:

McCOY M. GIBSON JR.　　　　　　　C. MARSHALL DANN
Attesting Officer　　　　　　　　Commissioner of Patents